US012646242B2

(12) United States Patent
Liu et al.

(10) Patent No.: US 12,646,242 B2
(45) Date of Patent: Jun. 2, 2026

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Xiang Liu, Shanghai (CN); Xiaojian Zhang, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 274 days.

(21) Appl. No.: 18/343,730

(22) Filed: Jun. 28, 2023

(65) Prior Publication Data

US 2023/0360312 A1      Nov. 9, 2023

Related U.S. Application Data

(63) Continuation of application No. PCT/CN2021/142746, filed on Dec. 29, 2021.

(30) Foreign Application Priority Data

Dec. 29, 2020   (CN) ........................ 202011594080.X
Dec. 30, 2020   (CN) ........................ 202011625201.2

(51) Int. Cl.
$G06T\ 15/06$         (2011.01)
$G06T\ 7/50$          (2017.01)
$G06T\ 7/90$          (2017.01)
(52) U.S. Cl.
CPC ................ $G06T\ 15/06$ (2013.01); $G06T\ 7/50$ (2017.01); $G06T\ 7/90$ (2017.01); $G06T$ $2207/20021$ (2013.01); $G06T\ 2210/21$ (2013.01)

(58) Field of Classification Search
CPC ......... G06T 15/06; G06T 15/08; G06T 17/00; G06T 7/50; G06T 7/0012; G06T 7/11;
(Continued)

(56) References Cited

U.S. PATENT DOCUMENTS

2011/0228055 A1    9/2011   Sharp
2012/0212496 A1    8/2012   Kulla
(Continued)

FOREIGN PATENT DOCUMENTS

CN       103049930 A      4/2013
CN       105374062        3/2016
(Continued)

OTHER PUBLICATIONS

International Search Report in PCT/CN2021/142746 mailed on Mar. 30, 2022, 6 pages.
(Continued)

*Primary Examiner* — Hau H Nguyen
(74) *Attorney, Agent, or Firm* — METIS IP LLC

(57) ABSTRACT

The present disclosure provides a system and method for image processing. The method may include obtaining an initial rendered image of a subject generated based on three-dimensional (3D) imaging data; obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model.

20 Claims, 10 Drawing Sheets

500

Obtaining an initial rendered image of a subject generated based on 3D imaging data acquired by an imaging device — 510

Obtaining one or more characteristic parameters corresponding to the 3D imaging data — 520

Generating a target rendered image of the subject based on the initial rendered image and the one or more characteristic parameters using a trained image processing model — 530

(58) Field of Classification Search
CPC ..... G06T 11/008; G06T 7/90; G06T 2210/21;
G06T 2211/441; G06T 2207/20021;
G06T 2207/30004
See application file for complete search history.

(56) References Cited

U.S. PATENT DOCUMENTS

| | | | | |
|---|---|---|---|---|
| 2017/0365051 | A1* | 12/2017 | Wahrenberg | ........... A61B 90/37 |
| 2020/0143522 | A1* | 5/2020 | Vogels | ..................... G06N 3/04 |
| 2020/0342653 | A1 | 10/2020 | Dupuis et al. | |
| 2021/0390761 | A1* | 12/2021 | Kowalski | .............. G06T 15/205 |

FOREIGN PATENT DOCUMENTS

| | | |
|---|---|---|
| CN | 111080765 | 4/2020 |
| CN | 111476866 | 7/2020 |
| CN | 112669427 | 4/2021 |
| WO | 2020217123 | 10/2020 |

OTHER PUBLICATIONS

Written Opinion in PCT/CN2021/142746 mailed on Mar. 30, 2022, 7 pages.
First Office Action in Chinese Application No. 202011594080.X mailed on Mar. 21, 2022, 16 pages.
László Szirmay-Kalos et al., Free Path Sampling in High Resolution Inhomogeneous Participating Media, Computer Graphics Forum, 30(1): 85-97, 2011.
Chakravarty R. Alla Chaitanya et al., Interactive Reconstruction of Monte Carlo Image Sequences Using a Recurrent Denoising Autoencoder, 36(4): 1-12, 2017.
Zahng, Xiaoyu, Unbiased Photon Gathering in Heterogeneous Media, China Master's Theses Full-text Database, Engineering Science and Technology Series, 2019, 78 pages.
D. Legrady et al., Woodcock Tracking With Arbitrary Sampling Cross Section Using Negative Weights, Annals of Nuclear Energy, 116-123, 2017.

* cited by examiner

<u>500</u>

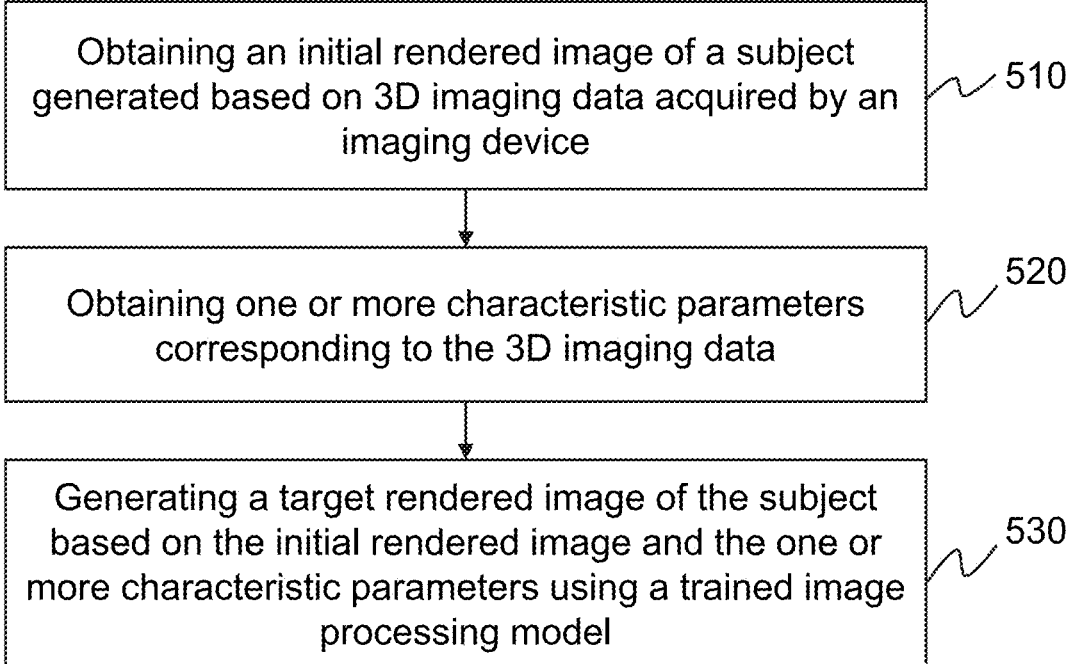

| |
|---|
| Obtaining an initial rendered image of a subject generated based on 3D imaging data acquired by an imaging device |

510

| |
|---|
| Obtaining one or more characteristic parameters corresponding to the 3D imaging data |

520

| |
|---|
| Generating a target rendered image of the subject based on the initial rendered image and the one or more characteristic parameters using a trained image processing model |

3D imaging data 1000
(16×16)

Data blocks 1010
(4×4)

3D imaging data 1200
(16×16)

First layer 1210 of pyramid tree
(16×16)

Third layer 1230 of pyramid tree
(4×4)

Second layer 1220 of pyramid tree
(8×8)

1305

3D imaging data 1200
(16×16)

First layer 1310 of pyramid tree
(16×16)

Third layer 1330 of pyramid tree
(4×4)

Second layer 1320 of pyramid tree
(8×8)

1400
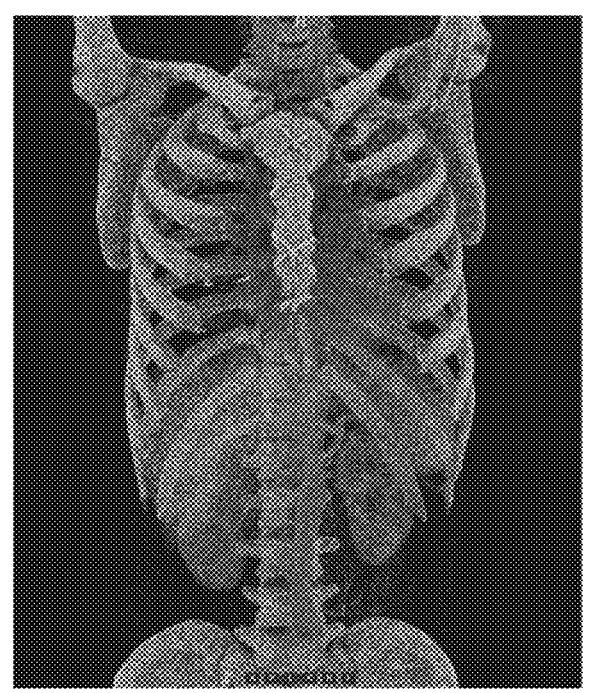
Sample initial rendered image 1410
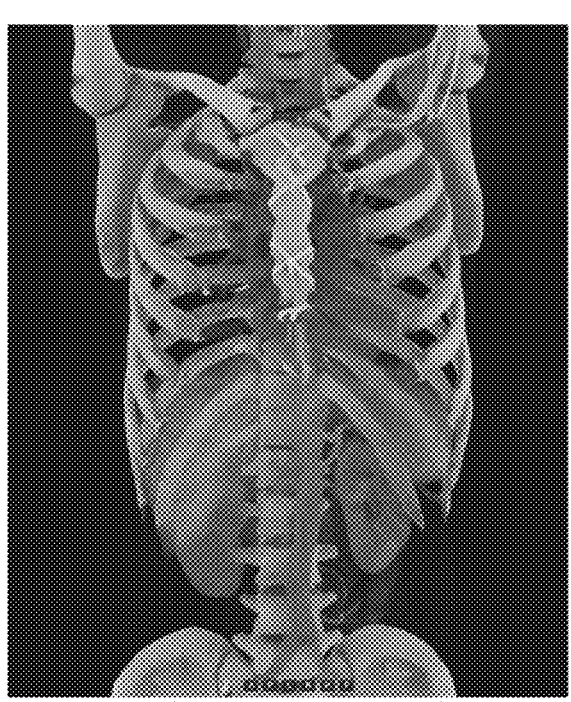
Reference rendered image 1420
FIG. 14

SYSTEMS AND METHODS FOR IMAGE PROCESSING

CROSS-REFERENCE TO RELATED APPLICATIONS

This application is a continuation of International Patent Application No. PCT/CN2021/142746, filed on Dec. 29, 2021, which claims priority of Chinese Patent Application No. 202011594080.X, filed on Dec. 29, 2020, and Chinese Patent Application No. 202011625201.2, filed on Dec. 30, 2020, the contents of each of which are hereby incorporated by reference.

TECHNICAL FIELD

The disclosure generally relates to medical imaging, and more particularly relates to systems and methods for image processing.

BACKGROUND

With the development of computer science and information technology, the physically based volume rendering (PBVR) technique is widely used in clinical detection and diagnosis. The PBVR technique involves rendering 3D imaging data (or "volume data") by performing one or more ray tracing operations. The ray tracing operation refers to simulating and/or modeling a process of tracing a point where a scene object (i.e., an object to be rendered) and a ray intersect with each other. Generally, in order to generate a target rendered image with as little noise as possible, a large number of ray tracing operations should be performed on the 3D imaging data. This process is often time-consuming and inefficient. Therefore, it is desirable to provide systems and methods for generating rendered images faster to facilitate interaction between users and 3D imaging data.

SUMMARY

According to an aspect of the present disclosure, a system for image processing is provided. The system may include at least one storage device storing a set of instructions, and at least one processor configured to communicate with the at least one storage device. When executing the executable instructions, the at least one processor may be configured to direct the system to perform one or more of the following operations. The operations may include obtaining an initial rendered image of a subject generated based on three-dimensional (3D) imaging data; obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model. The target rendered image may have a higher image quality than the initial rendered image.

In some embodiments, the obtaining an initial rendered image of a subject generated based on 3D imaging data may include performing a threshold count of ray tracing operations on the 3D imaging data to determine a plurality of radiance values; and generating the initial rendered image based on the plurality of radiance values of the plurality of pixels. Each radiance value may correspond to one pixel of a plurality of pixels on an image plane.

In some embodiments, to determine each radiance value of the plurality of radiance values, the operations may further include determining a threshold count of candidate radiance values by performing the threshold count of ray tracing operations; and determining the radiance value by averaging the threshold count of candidate radiance values. Each ray tracing operation may correspond to one candidate radiance value.

In some embodiments, the obtaining an initial rendered image of a subject generated based on 3D imaging data may include dividing the 3D imaging data into a plurality of data blocks, each data block including multiple voxels of the 3D imaging data; generating a plurality of homogeneous data blocks; and determining, based on the plurality of homogeneous data blocks, a plurality of target sampling points by performing a ray tracing operation. In some embodiments, the plurality of homogeneous data blocks may be determined by determining a maximum extinction coefficient among multiple extinction coefficients of the multiple voxels in each data block of the plurality of data blocks; and generating the plurality of homogeneous data blocks, in each of which all the multiple voxels have the maximum extinction coefficient by designating a virtual extinction coefficient to each voxel in the data block.

In some embodiments, the one or more characteristic parameters may include at least one of a color, a depth, a normal vector, or an opacity of each pixel on an image plane.

In some embodiments, the determining one or more characteristic parameters corresponding to the 3D imaging data by performing a ray casting operation on the 3D imaging data may include for each pixel on the image plane, casting a ray in a projection direction from the pixel to the 3D imaging data; determining, based on a first relationship between each voxel value of the 3D imaging data and one color, colors of voxels that the ray passes through; and determining the color of the pixel on the image plane based on the colors of the voxels.

In some embodiments, the operations may further include determining, based on a second relationship between each voxel value of the 3D imaging data and one opacity, a current opacity of each voxel that the ray passes through; for each voxel, determining a superimposed opacity of the voxel based on the current opacity of the voxel and previous opacities of previous voxels; and determining the depth or the normal vector of the pixel on the image plane by comparing the superimposed opacity of each voxel with an opacity threshold.

In some embodiments, the determining the depth or the normal vector of the pixel on the image plane by comparing the superimposed opacity of each voxel with an opacity threshold may include in response to determining that there are one or more voxels whose superimposed opacity is greater than the opacity threshold, determining, based on location information of a foremost voxel whose superimposed opacity is greater than the opacity threshold, the depth of the pixel on the image plane; and determining, based on voxel values of the 3D imaging data surrounding the foremost voxel, the normal vector of the pixel on the image plane.

In some embodiments, the determining the depth or the normal vector of the pixel on the image plane by comparing the superimposed opacity of each voxel with an opacity threshold may include in response to determining that there is no voxel whose superimposed opacity is greater than the opacity threshold, determining, based on location information of a reference voxel with a largest opacity among the voxels that the ray passes through, the depth of the pixel on the image plane; and determining, based on voxel values of the 3D imaging data surrounding the reference voxel, the normal vector of the pixel on the image plane.

In some embodiments, to obtain the trained image processing model, the operations may further include obtaining a plurality of training samples, each training sample including a sample initial rendered image, one or more sample characteristic parameters corresponding to the sample initial rendered image, and a reference rendered image corresponding to the sample initial rendered image and having a higher image quality than the corresponding sample initial rendered image; and generating a trained image processing model by training a preliminary model using the plurality of training samples in a training process. During the training process the sample initial rendered image and the one or more sample characteristic parameters may serve as inputs for training the preliminary model, and the reference rendered image may serve as a desired output for training the preliminary model.

In some embodiments, the obtaining a plurality of training samples may include for each training sample, obtaining sample 3D imaging data of a sample subject acquired by a sample imaging device; determining the initial rendered image by performing a first count of ray tracing operations on the sample 3D imaging data; and determining the reference rendered image by performing a second count of ray tracing operations on the sample 3D imaging data. The second count may be greater than the first count.

In some embodiments, the training process may include a plurality of iterations. At least one iteration of the plurality of iterations may include determining a prediction output by inputting the sample initial rendered image and the one or more sample characteristic parameters into an intermediate model; determining a value of a loss function based on the prediction output and the reference rendered image; and updating at least one parameter of the intermediate model based on the value of the loss function. The intermediate model may be the preliminary model in the first iteration of the plurality of iterations or an updated model generated in a previous iteration.

In some embodiments, the loss function may include at least one of a first term related to a first difference between each pixel value of the prediction output and the corresponding pixel value of the reference rendered image; or a second term related to a second difference between a gradient of each pixel value of the prediction output and a gradient of the corresponding pixel value of the reference rendered image.

According to another aspect of the present disclosure, a method for image processing is provided. The method may be implemented on a computing device having at least one processor and at least one storage device. The method may include obtaining an initial rendered image of a subject generated based on three-dimensional (3D) imaging data; obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model. The target rendered image may have a higher image quality than the initial rendered image.

According to yet an aspect of the present disclosure, a non-transitory computer readable medium is provided. The non-transitory computer readable medium may include at least one set of instructions for image processing. When executed by at least one processor of a computing device, the at least one set of instructions direct the at least one processor to perform a method. The method may include obtaining an initial rendered image of a subject generated based on three-dimensional (3D) imaging data; obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model. The target rendered image may have a higher image quality than the initial rendered image.

According to yet an aspect of the present disclosure, a system for model training is provided. The system may include at least one storage device storing a set of instructions, and at least one processor configured to communicate with the at least one storage device. When executing the executable instructions, the at least one processor may be configured to direct the system to perform one or more of the following operations. The operations may include obtaining a plurality of training samples. Each training sample may include a sample initial rendered image, one or more sample characteristic parameters corresponding to the sample initial rendered image, and a reference rendered image corresponding to the sample initial rendered image and having a higher image quality than the corresponding sample initial rendered image. The operations may further include generating a trained image processing model by training a preliminary model using the plurality of training samples in a training process. During the training process the sample initial rendered image and the one or more sample characteristic parameters may serve as inputs for training the preliminary model, and the reference rendered image may serve as a desired output for training the preliminary model.

According to yet an aspect of the present disclosure, a method for model training is provided. The method may be implemented on a computing device having at least one processor and at least one storage device. The method may include obtaining a plurality of training samples. Each training sample may include a sample initial rendered image, one or more sample characteristic parameters corresponding to the sample initial rendered image, and a reference rendered image corresponding to the sample initial rendered image and having a higher image quality than the corresponding sample initial rendered image. The operations may further include generating a trained image processing model by training a preliminary model using the plurality of training samples in a training process. During the training process the sample initial rendered image and the one or more sample characteristic parameters may serve as inputs for training the preliminary model, and the reference rendered image may serve as a desired output for training the preliminary model.

According to yet an aspect of the present disclosure, a non-transitory computer readable medium is provided. The non-transitory computer readable medium may include at least one set of instructions for model training. When executed by at least one processor of a computing device, the at least one set of instructions direct the at least one processor to perform a method. The method may include obtaining a plurality of training samples. Each training sample may include a sample initial rendered image, one or more sample characteristic parameters corresponding to the sample initial rendered image, and a reference rendered image corresponding to the sample initial rendered image and having a higher image quality than the corresponding sample initial rendered image. The operations may further include generating a trained image processing model by training a preliminary model using the plurality of training samples in a training process. During the training process the sample initial rendered image and the one or more sample characteristic parameters may serve as inputs for training the preliminary model, and the reference rendered image may serve as a desired output for training the preliminary model.

According to yet an aspect of the present disclosure, a system for distance sampling is provided. The system may include at least one storage device storing a set of instructions, and at least one processor configured to communicate with the at least one storage device. When executing the executable instructions, the at least one processor may be configured to direct the system to perform one or more of the following operations. The operations may include obtaining three-dimensional (3D) imaging data of a subject acquired by an imaging device. The 3D imaging data may include a plurality of voxels. At least one voxel of the plurality of voxels may include multiple real particles. The operations may further include dividing the 3D imaging data into a plurality of data blocks, each data block including multiple voxels of the 3D imaging data; generating a plurality of homogeneous data blocks; and determining, based on the plurality of homogeneous data blocks, a plurality of target sampling points by performing a ray tracing operation. In some embodiments, the plurality of homogeneous data blocks may be determined by determining a maximum extinction coefficient among multiple extinction coefficients of the multiple voxels in each data block of the plurality of data blocks; and generating the plurality of homogeneous data blocks in each of which all the multiple voxels have the maximum extinction coefficient by designating a virtual extinction coefficient to each voxel in the data block.

In some embodiments, the dividing the 3D imaging data into a plurality of data blocks may include dividing, based on a first resolution of the 3D imaging data, the 3D imaging data into the plurality of data blocks each of which has a second resolution smaller than the first resolution.

In some embodiments, the dividing the 3D imaging data into a plurality of data blocks may include determining, based on a first resolution of the 3D imaging data, a pyramid tree including at least two layers of data blocks. Each layer of the at least two layers of data blocks may include the plurality of voxels. The top layer of the at least two layers may have the first resolution. From top to bottom of the pyramid tree, a current count of data blocks in a current layer may be greater than a previous count of data blocks in a previous layer; and each data block of the current layer of the at least two layers may have a current resolution smaller than a previous resolution of each data block of the previous layer.

In some embodiments, the ray tracing operation may include casting a ray passing through the 3D imaging data in a projection direction from each pixel on an image plane. At least a portion of the plurality of target sampling points may be on a path of the ray corresponding to one pixel on the image plane. The determining, based on the plurality of homogeneous data blocks, a plurality of target sampling points by performing a ray tracing operation may include for each pixel on the image plane, determining, based on the maximum extinction coefficient of an intermediate homogeneous data block corresponding to an intermediate starting point, a sampling path length; determining, based on the sampling path length, a current candidate sampling point; determining whether the current candidate sampling point is a real particle; and in response to determining that the current candidate sampling point is the real particle, designating the current candidate sampling point as the target sampling point. The intermediate starting point may be a starting point of the ray on the 3D imaging data or a previous candidate sampling point. The intermediate homogeneous data block may be a current homogeneous data block to which the intermediate starting point belongs.

In some embodiments, the determining whether the current candidate sampling point is a real particle may include determining intersection points between the ray and at least part of the plurality of homogeneous data blocks; determining, based on the intersection points, a target homogeneous data block to which the current candidate sampling point belongs; determining a location of the current candidate sampling point in the target homogeneous data block; and determining, based on the location of the current candidate sampling point in the target homogeneous data block, whether the current candidate sampling point is the real particle.

In some embodiments, when the plurality of data blocks form a pyramid tree including at least two layers of data blocks, the determining intersection points between the ray and at least part of the plurality of homogeneous data blocks may include determining the intersection points by performing a recursive operation on intersecting between the ray and each homogeneous data block in each layer of the at least two layers.

In some embodiments, the determining, based on the intersection points, a target homogeneous data block to which the current candidate sampling point belongs may include determining, based on a distance between every two adjacent intersection points, one or more step distances; and determining, based on the one or more step distances, the target homogeneous data block.

In some embodiments, the determining, based on the location of the current candidate sampling point in the target homogeneous data block, whether the current candidate sampling point is the real particle may include obtaining a determination probability that a particle at the location of the current candidate sampling point is a real particle; and determining, based on the determination probability, whether the current candidate sampling point is the real particle.

In some embodiments, the operations may further include in response to determining that the current candidate sampling point is a virtual particle, designating the current candidate sampling point as an updated starting point; determining an updated candidate sampling point from the updated starting point without changing the projection direction of the ray; and determining whether the updated candidate sampling point is the target sampling point.

According to yet an aspect of the present disclosure, a method for distance sampling is provided. The method may be implemented on a computing device having at least one processor and at least one storage device. The method may include obtaining three-dimensional (3D) imaging data of a subject acquired by an imaging device. The 3D imaging data may include a plurality of voxels. At least one voxel of the plurality of voxels may include multiple real particles. The operations may further include dividing the 3D imaging data into a plurality of data blocks, each data block including multiple voxels of the 3D imaging data; generating a plurality of homogeneous data blocks; and determining, based on the plurality of homogeneous data blocks, a plurality of target sampling points by performing a ray tracing operation. In some embodiments, the plurality of homogeneous data blocks may be determined by determining a maximum extinction coefficient among multiple extinction coefficients of the multiple voxels in each data block of the plurality of data blocks; and generating the plurality of homogeneous data blocks in each of which all the multiple voxels have the maximum extinction coefficient by designating a virtual extinction coefficient to each voxel in the data block.

According to yet an aspect of the present disclosure, a non-transitory computer readable medium is provided. The non-transitory computer readable medium may include at least one set of instructions for distance sampling. When executed by at least one processor of a computing device, the at least one set of instructions direct the at least one processor to perform a method. The method may include obtaining three-dimensional (3D) imaging data of a subject acquired by an imaging device. The 3D imaging data may include a plurality of voxels. At least one voxel of the plurality of voxels may include multiple real particles. The operations may further include dividing the 3D imaging data into a plurality of data blocks, each data block including multiple voxels of the 3D imaging data; generating a plurality of homogeneous data blocks; and determining, based on the plurality of homogeneous data blocks, a plurality of target sampling points by performing a ray tracing operation. In some embodiments, the plurality of homogeneous data blocks may be determined by determining a maximum extinction coefficient among multiple extinction coefficients of the multiple voxels in each data block of the plurality of data blocks; and generating the plurality of homogeneous data blocks in each of which all the multiple voxels have the maximum extinction coefficient by designating a virtual extinction coefficient to each voxel in the data block.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for generating a target rendered image according to some embodiments of the present disclosure;

FIG. 14 is a schematic diagram illustrating exemplary images of a training sample according to some embodiments of the present disclosure.

DETAILED DESCRIPTION

Figure 1:
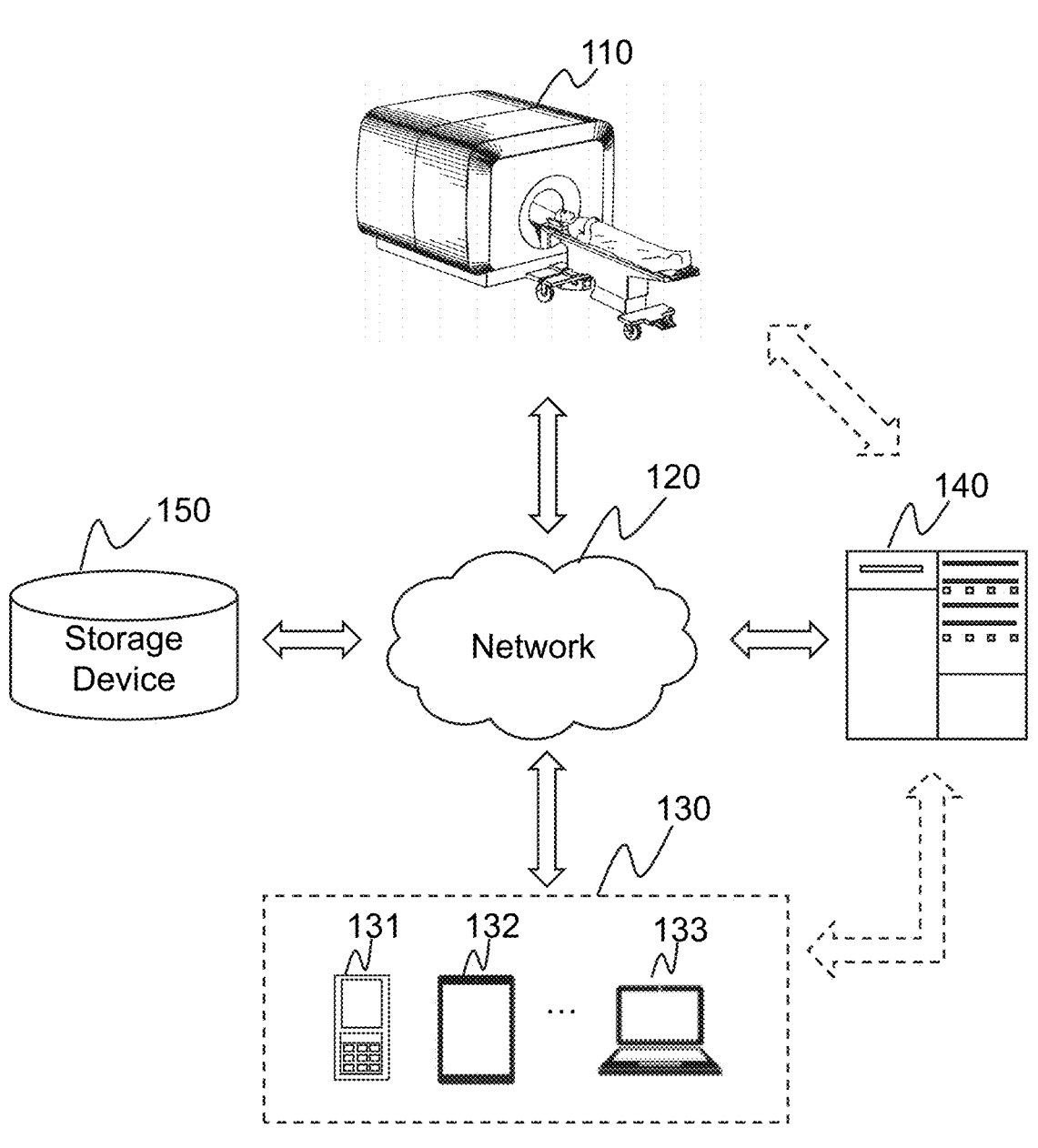
FIG. 1 is a schematic diagram illustrating an exemplary image processing system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including" when used in this disclosure, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections, or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/ block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an erasable programmable read-only memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/ units/blocks but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The term "image" in the present disclosure is used to collectively refer to image data (e.g., 3D imaging data, projection data) and/or images of various forms, including a two-dimensional (2D) image, a three-dimensional (3D) image, a four-dimensional (4D), etc. The term "pixel" and "voxel" in the present disclosure are used interchangeably to refer to an element of an image. The term "region," "location," and "area" in the present disclosure may refer to a location of an anatomical structure shown in the image or an actual location of the anatomical structure existing in or on a target subject's body, since the image may indicate the actual location of a certain anatomical structure existing in or on the target subject's body.

In the present disclosure, a representation of a subject (e.g., a patient, a subject, or a portion thereof) in an image may be referred to as "subject" for brevity. For instance, a representation of an organ or tissue (e.g., a heart, a liver, a lung) in an image may be referred to as an organ or tissue for brevity. Further, an image including a representation of a subject may be referred to as an image of a subject or an image including a subject for brevity. Still further, an operation performed on a representation of a subject in an image may be referred to as an operation performed on a subject for brevity. For instance, a segmentation of a portion of an image including a representation of an organ or tissue from the image may be referred to as a segmentation of an organ or tissue for brevity.

An aspect of the present disclosure relates to systems and methods for image processing. For example, the system may obtain an initial rendered image of a subject generated based on three-dimensional (3D) imaging data acquired by an imaging device. The system may obtain one or more characteristic parameters corresponding to the 3D imaging data determined by performing a ray casting operation on the 3D imaging data. The system may further generate a target rendered image of the subject by inputting the initial rendered image and the one or more characteristic parameters into a trained image processing model. The target rendered image may have a higher image quality (e.g., measured by one or more image parameters) than the initial rendered image. Accordingly, the target rendered image having the higher image quality than the initial rendered image may be generated by directly using the trained image processing model, which may improve the processing speed for generating the target rendered image. In addition, since both the one or more characteristic parameters corresponding to the 3D imaging data and the initial rendered image are inputted to the trained image processing model, the trained image processing model may retain more image features, so that the generated target rendered image may be closer to a real image corresponding to the 3D imaging data, thereby improving the rendering quality of the target rendered image.

Another aspect of the present disclosure relates to systems and methods for distance sampling. For example, the system may obtain 3D imaging data of a subject acquired by an imaging device. The 3D imaging data may include a plurality of voxels. At least one voxel of the plurality of voxels may include multiple real particles. The system may further divide the 3D imaging data into a plurality of data blocks. Each data block may include multiple voxels of the 3D imaging data. The system may further generate a plurality of homogeneous data blocks by determining a maximum extinction coefficient among multiple extinction coefficients of the multiple voxels in each data block of the plurality of data blocks and generating the plurality of homogeneous data blocks in each of which all the multiple voxels have the maximum extinction coefficient by designating a virtual extinction coefficient to each voxel in the data block. The system may further determine a plurality of target sampling points based on the plurality of homogeneous data blocks by performing a ray tracing operation. Accordingly, by constructing the plurality of homogeneous data blocks based on the 3D imaging data, it may greatly facilitate the subsequent ray tracking, thereby improving the speed of distance sampling. Specifically, especially when a maximum extinction coefficient of the 3D imaging data is much larger than a minimum extinction coefficient of the 3D imaging data, step distances for distance sampling may be increased, thereby improving the efficiency of distance sampling and further increasing the generation speed of the target rendered image.

FIG. 1 is a schematic diagram illustrating an exemplary image processing system according to some embodiments of the present disclosure.

As illustrated in FIG. 1, an image processing system 100 may include an imaging device 110, a network 120, a terminal device 130, a processing device 140, and a storage device 150. The components in the image processing system 100 may be connected in one or more of various ways. Merely by way of example, the imaging device 110 may be connected to the processing device 140 through the network 120. As another example, the imaging device 110 may be connected to the processing device 140 directly as illustrated in FIG. 1. As a further example, the terminal device 130 may be connected to another component of the image processing system 100 (e.g., the processing device 140) via the network 120. As still a further example, the terminal device 130 may be connected to the processing device 140 directly as illustrated by the dotted arrow in FIG. 1. As still a further example, the storage device 150 may be connected to another component of the image processing system 100 (e.g., the processing device 140) directly as illustrated in FIG. 1, or through the network 120.

The imaging device 110 may be configured to acquire 3D imaging data relating to at least part of a subject. The subject may be biological or non-biological. For example, the subject may include a patient, an animal, a plant, a man-made subject, etc. As another example, the subject may include a specific portion, organ, and/or tissue of the patient. For example, the subject may include the head, the chest, the neck, the thorax, the heart, the stomach, an arm, a palm, a blood vessel, soft tissue, a tumor, nodules, or the like, or any combination thereof. In some embodiments, the imaging device 110 may include a computed tomography (CT) device, a positron emission tomography (PET) device, a single-photon emission computed tomography (SPECT) device, a magnetic resonance imaging (MRI) device, a magnetic resonance spectroscopy (MRS) device, a PET-MRI device, a PET-CT device, a SPECT-CT, an ultrasound scanning device, or the like, or any combination thereof.

The network 120 may include any suitable network that can facilitate the exchange of information and/or data for the image processing system 100. In some embodiments, one or more components (e.g., the imaging device 110, the processing device 140, the storage device 150, or the terminal device 130) of the image processing system 100 may communicate information and/or data with one or more other components of the image processing system 100 via the network 120. For example, the processing device 140 may obtain 3D imaging data from the imaging device 110 via the network 120. As another example, the processing device 140 may obtain user instructions from the terminal device 130 via the network 120. In some embodiments, the network 120 may be any type of wired or wireless network, or a combination thereof.

The terminal device 130 may be connected to and/or communicate with the imaging device 110, the processing device 140, and/or the storage device 150. For example, the terminal device 130 may enable user interactions between a user and the image processing system 100. For example, the user may instruct the imaging device 110 to acquire 3D imaging data or instruct the processing device 140 to process images via the terminal device 130. In some embodiments, the terminal device 130 may include a mobile device 131, a tablet computer 132, a laptop computer 133, or the like, or any combination thereof. In some embodiments, the terminal device 130 may be part of the processing device 140.

The processing device 140 may process data and/or information obtained from the imaging device 110, the terminal device 130, and/or the storage device 150. In some embodiments, the processing device 140 may process 3D imaging data obtained from the imaging device 110 or the storage device 150. For example, the processing device 140 may obtain 3D imaging data of a subject and generate an initial rendered image of the subject based on the 3D imaging data. The processing device 140 may further determine one or more characteristic parameters of the 3D imaging data. The processing device 140 may generate a target rendered image of the subject by applying a trained image processing model based on the initial rendered image and the one or more characteristic parameters. As another example, the processing device 140 may generate the trained image processing model by training a preliminary model using a plurality of training samples. In some embodiments, the generation and/or updating of the trained image processing model may be performed on a processing device, while the application of the trained image processing model may be performed on a different processing device. In some embodiments, the generation of the trained image processing model may be performed on a processing device of a system different from the image processing system 100 or a server different from a server including the processing device 140 on which the application of the trained image processing model is performed. For instance, the generation of the trained image processing model may be performed on a first system of a vendor who provides and/or maintains such a trained image processing model and/or has access to training samples used to generate the trained image processing model, while image processing based on the provided trained image processing model may be performed on a second system of a client of the vendor. In some embodiments, the generation of the trained image processing model may be performed online in response to a request for image processing (e.g., image denoising). In some embodiments, the generation of the trained image processing model may be performed offline.

In some embodiments, the trained image processing model may be generated and/or updated (or maintained) by, e.g., the manufacturer of the imaging device 110 or a vendor. For instance, the manufacturer or the vendor may load the trained image processing model into the image processing system 100 or a portion thereof (e.g., the processing device 140) before or during the installation of the imaging device 110 and/or the processing device 140, and maintain or update the trained image processing model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new image reconstruction model) or a portion of a model that substitute or supplement a corresponding portion of the model.

In some embodiments, the processing device 140 may be a single server or a server group, etc. The server group can be centralized or distributed. In some embodiments, the processing device 140 may be local to or remote from the image processing system 100. In some embodiments, the processing device 140 may be implemented on a cloud platform. In some embodiments, the processing device 140 may be implemented by a computing device 200 having one or more components as described in connection with FIG. 2.

The storage device 150 may store data, instructions, and/or any other information. In some embodiments, the storage device 150 may store data obtained from the imaging device 110, the terminal device 130, and/or the processing device 140. In some embodiments, the storage device 150 may store data and/or instructions that the processing device 140 may execute or use to perform exemplary methods described in the present disclosure. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform.

In some embodiments, the storage device 150 may be connected to the network 120 to communicate with one or more other components (e.g., the processing device 140, the terminal device 130) of the image processing system 100. One or more components of the image processing system 100 may access the data or instructions stored in the storage device 150 via the network 120. In some embodiments, the storage device 150 may be part of the processing device 140, or directly or indirectly connected to the processing device 140.

It should be noted that the above description of the image processing system 100 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 2:
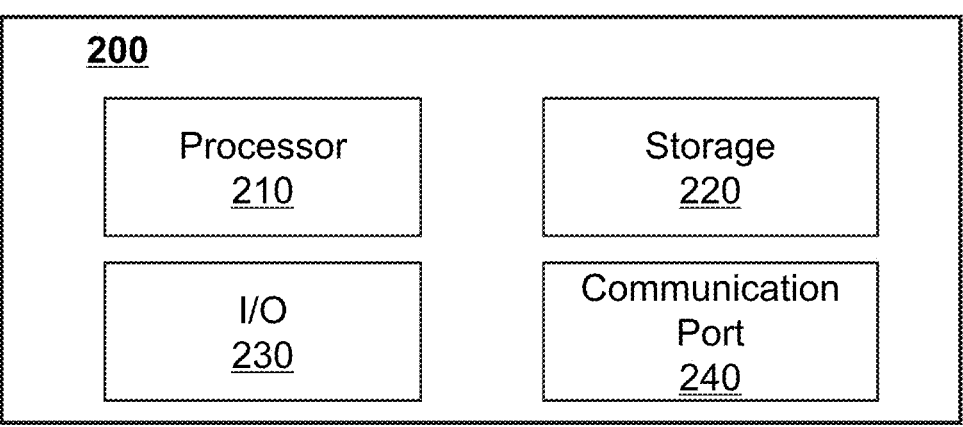
FIG. 2 is a schematic diagram illustrating hardware and/or software components of an exemplary computing device according to some embodiments of the present disclosure.

FIG. 2 is a schematic diagram illustrating hardware and/or software components of an exemplary computing device according to some embodiments of the present disclosure. In some embodiments, a component of the image processing system 100 (e.g., the processing device 140) may be implemented on the computing device 200. As illustrated in FIG. 2, the computing device 200 may include a processor 210, a storage 220, an input/output (I/O) 230, and a communication port 240.

The processor 210 may execute computer instructions (e.g., program codes) and perform functions of the processing device 140 in accordance with techniques described herein. The computer instructions may include, for example, routines, programs, objects, components, data structures, procedures, modules, and functions, which perform particular functions described herein. For example, the processor 210 may process an initial rendered image obtained from the imaging device 110 using a trained image processing model and generate a target rendered image.

Merely for illustration, only one processor is described in the computing device 200. However, it should be noted that the computing device 200 in the present disclosure may also include multiple processors, and thus operations and/or method operations that are performed by one processor as described in the present disclosure may also be jointly or separately performed by the multiple processors.

The storage 220 may store data/information obtained from the imaging device 110, the terminal device 130, the storage device 150, and/or any other component of the image processing system 100. In some embodiments, the storage 220 may store one or more programs and/or instructions to perform exemplary methods described in the present disclosure. For example, the storage 220 may store a program for the processing device 140 to train an image processing model based on training samples.

The I/O 230 may input and/or output signals, data, information, etc. In some embodiments, the I/O 230 may enable a user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof.

The communication port 240 may be connected to a network (e.g., the network 120) to facilitate data communications. The communication port 240 may establish connections between the processing device 140 and the imaging device 110, the terminal device 130, and/or the storage device 150. The connection may be a wired connection, a wireless connection, any other communication connection that can enable data transmission and/or reception, and/or any combination of these connections.

Figure 3:
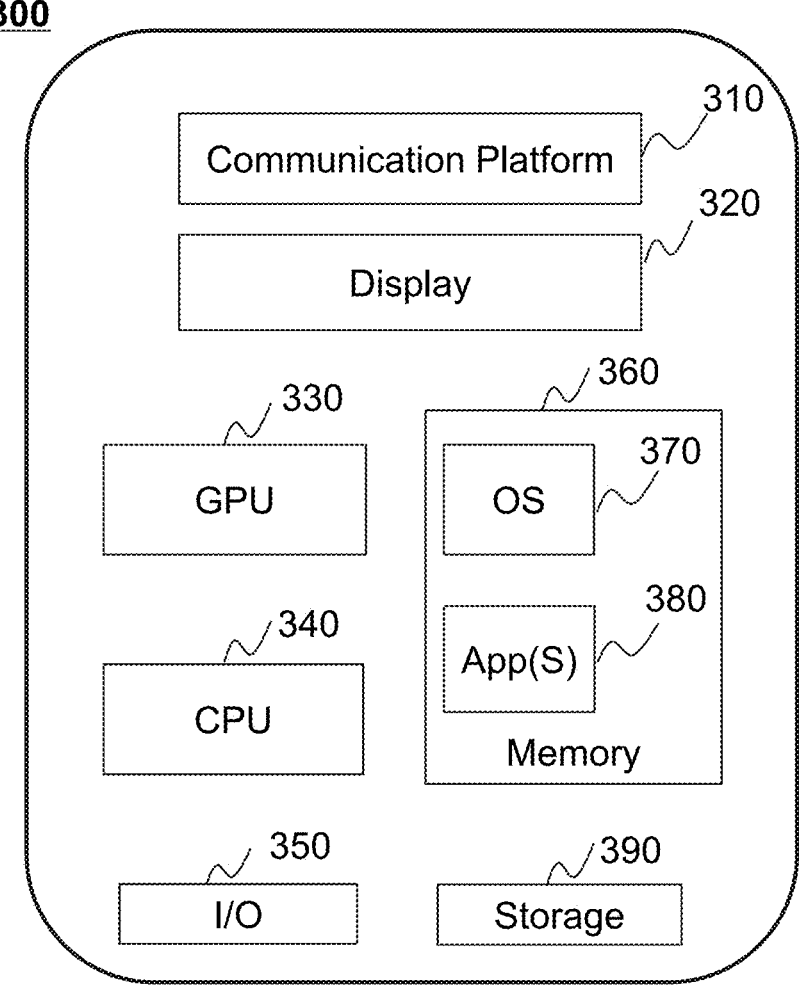
FIG. 3 is a schematic diagram illustrating hardware and/or software components of an exemplary mobile device according to some embodiments of the present disclosure.

FIG. 3 is a schematic diagram illustrating exemplary hardware components and/or software components of an exemplary mobile device according to some embodiments of the present disclosure. In some embodiments, one or more components (e.g., the terminal device 130 and/or the processing device 140) of the image processing system 100 may be implemented on the mobile device 300.

As illustrated in FIG. 3, the mobile device 300 may include a display 310, a communication platform 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the image processing system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4A:
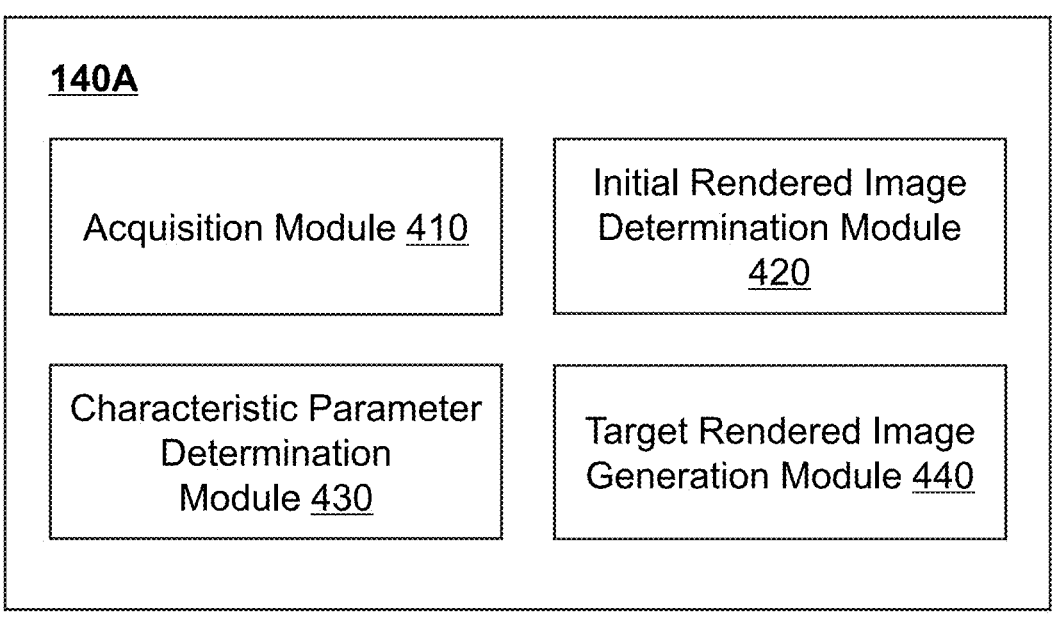
FIG. 4A is a block diagram illustrating an exemplary processing device according to some embodiments of the present disclosure.
Figure 4B:
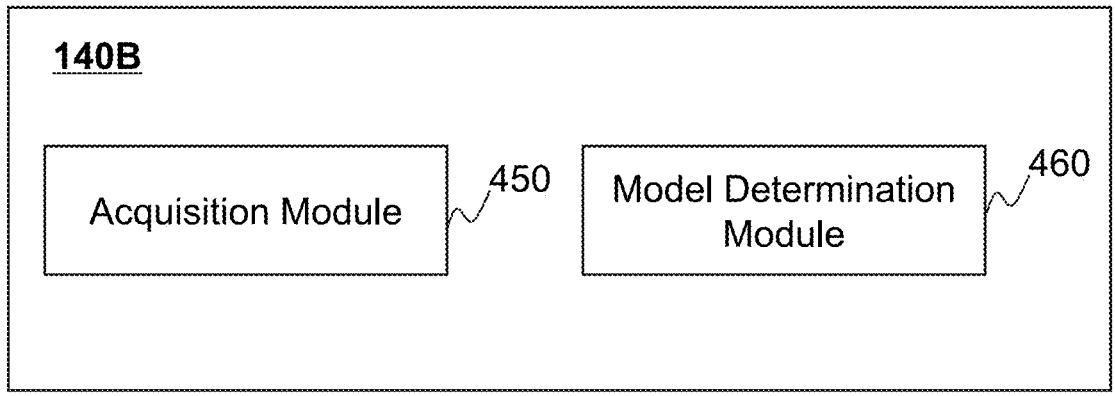
FIG. 4B is a block diagram illustrating an exemplary processing device according to some embodiments of the present disclosure.

FIGS. 4A and 4B are block diagrams illustrating exemplary processing devices according to some embodiments of the present disclosure. The processing devices 140A and 140B may be exemplary processing devices 140 as described in connection with FIG. 1. In some embodiments, the processing device 140A may be configured to apply a trained image processing model in generating a target rendered image of a subject. The processing device 140B may be configured to generate a trained image processing model by model training. In some embodiments, the processing devices 140A and 140B may be respectively implemented on a processing unit (e.g., the processor 210 illustrated in FIG. 2 or the CPU 340 illustrated in FIG. 3). Merely by way of example, the processing devices 140A may be implemented on a CPU 340 of a terminal device, and the processing device 140B may be implemented on a computing device 200. Alternatively, the processing devices 140A and 140B may be implemented on a same computing device 200 or a same CPU 340. For example, the processing devices 140A and 140B may be implemented on a same computing device 200.

As illustrated in FIG. 4A, the processing device 140A may include an acquisition module 410, an initial rendered image determination module 420, a characteristic parameter determination module 430, and a target rendered image generation module 440.

The acquisition module 410 may be configured to obtain data and/or information associated with the image processing system 100. For example, the acquisition module 410 may obtain an initial rendered image of a subject generated based on 3D imaging data acquired by an imaging device. As another example, the acquisition module 410 may obtain one or more characteristic parameters corresponding to the 3D imaging data. As a further example, the acquisition module 410 may also obtain a trained image processing model.

The initial rendered image determination module 420 may be configured to determine the initial rendered image of the subject based on the 3D imaging data. For example, the initial rendered image determination module 420 may generate the initial rendered image by performing a threshold count of ray tracing operations on the 3D imaging data.

The characteristic parameter determination module 430 may be configured to determine one or more characteristic parameters corresponding to the 3D imaging data by performing a ray casting operation on the 3D imaging data. In some embodiments, the characteristic parameter(s) may include a color, a depth, a normal vector (or normal line), an opacity, etc., of each pixel on the image plane.

The target rendered image generation module 440 may be configured to generate a target rendered image of the subject based on the initial rendered image and the one or more characteristic parameters using a trained image processing model. The target rendered image may have a higher image quality than the initial rendered image. The target rendered image generation module 440 may input the initial rendered image and the one or more characteristic parameters into the trained image processing model to determine the target rendered image.

As illustrated in FIG. 4B, the processing device 140B may include an acquisition module 450 and a model determination module 460.

The acquisition module 450 may be configured to obtain a plurality of training samples. Each training sample may include a sample initial rendered image, one or more sample characteristic parameters corresponding to the sample initial rendered image, and a reference rendered image corresponding to the sample initial rendered image and having a higher image quality than the corresponding sample initial rendered image.

The model determination module 460 may be configured to generate a trained image processing model by training a preliminary model using the training samples in a training process. In some embodiments, the training process may include a plurality of iterations. The sample initial rendered image and the corresponding sample characteristic parameter(s) in each training sample may serve as inputs of the training process. The reference rendered image in the training sample may serve as a reference output of the training process. During the training process, a prediction output corresponding to the sample initial rendered image may be determined. The model determination module 460 may generate the trained image processing model based on a difference between the prediction output and the corresponding reference rendered image. It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the processing device 140A and/or the processing device 140B may share two or more of the modules, and any one of the modules may be divided into two or more units. For instance, the processing devices 140A and 140B may share a same acquisition module, that is, the acquisition module 410 and the acquisition module 450 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140. In some embodiments, the initial rendered image determination module 420 may include a division unit, a homogeneous data block determination unit, a candidate sampling portion determination unit, a sampling unit, etc.

FIG. 5 is a flowchart illustrating an exemplary process for generating a target rendered image according to some embodiments of the present disclosure. In some embodiments, a process 500 may be implemented as a set of instructions (e.g., an application) stored in the storage device 150, the storage 220, or the storage 390. The processing device 140A (e.g., implemented on the processing device 140, the processor 210, the CPU 340, and/or one or more modules illustrated in FIG. 4A) may execute the set of instructions, and when executing the instructions, the processing device 140A may be configured to perform the process 500. The operations of the illustrated process 500 presented below are intended to be illustrative. In some embodiments, the process 500 may be accomplished with one or more additional operations not described, and/or without one or more of the operations discussed. Additionally, the order of the operations of the process 500 illustrated in FIG. 5 and described below is not intended to be limiting.

In 510, the processing device 140A (e.g., the acquisition module 410) may obtain an initial rendered image of a subject generated based on 3D imaging data. The subject may be biological or non-biological. For example, the subject may include a patient, an animal, a plant, a man-made object, etc. as described elsewhere in the present disclosure (e.g., FIG. 1 and the descriptions thereof). In some embodiments, the 3D imaging data may be acquired by an imaging device. The imaging device may scan the subject to obtain the 3D imaging data. In some embodiments, the imaging device may include a CT device, a PET device, a SPECT device, an MRI device, an ultrasound scanning device, a PET-MRI device, a PET-CT device, a SPECT-CT device, etc., as described elsewhere in the present disclosure (e.g., FIG. 1 and the descriptions thereof).

In some embodiments, the initial rendered image may be obtained from the imaging device (e.g., the imaging device 110), the storage device 150, or any other storage device. For example, the imaging device may transmit acquired 3D imaging data (e.g., projection data) to the storage device 150 or any other storage device for storage. The processing device 140A may retrieve the 3D imaging data from the storage device 150 or any other storage device and generate the initial rendered image based on the retrieved 3D imaging data. As another example, the processing device 140A may obtain the initial rendered image from the imaging device directly.

In some embodiments, the initial rendered image may be an image rendered based on a physically-based volume rendering (PBVR) technique. For example, one or more ray tracing operations may be employed to render the 3D imaging data to generate the initial rendered image. As used herein, a ray tracing operation refers to simulating and/or modeling a process of tracing a point where the subject (or the imaging data of the subject) and a ray intersect with each other. The ray may be casted from a light source outside the 3D imaging data. During the ray tracing operation, the final energy distribution may be obtained by simulating a light energy transfer process, in which the reflection and/or scattering of the energy of the ray on subject surfaces or in the subject may be calculated.

The initial rendered image may include a representation of the subject using a plurality of pixels with pixel values (e.g., luminance values, gray values, colors (or RGB values), saturation values, etc.). In some embodiments, the initial rendered image may be a high-dynamic range (HDR) image or a low-dynamic range (LDR) image. In some embodiments, the initial rendered image may be generated by performing a threshold count of ray tracing operations on the 3D imaging data. Specifically, during each ray tracing operation, for each pixel of an image plane, a ray may be casted in a projection direction from the pixel to the 3D imaging data. As used herein, the image plane refers to a given imaginary plane on which an output image frame (e.g., the initial rendered image) is produced. A pixel of the image plane may correspond to one pixel of the initial rendered image. In some embodiments, for the same pixel, different ray tracing operations may correspond to different projection directions (or paths). For example, for the same pixel, the ray may be randomly shifted along the projection direction during different ray tracing operations. That is, a ray (e.g., ray R1 in FIG. 9) casted during one ray tracing operation and a ray (e.g., ray R4 in FIG. 9) casted during another ray tracing operation may pass through different parts of the 3D imaging data. The processing device 140A may determine a candidate radiance value of each pixel on the image plane during each ray tracing operation. For each pixel on the image plane, the processing device 140A may determine a target radiance value of the pixel by averaging the threshold count of candidate radiance values. The processing device 140A may determine the initial rendered image based on the plurality of target radiance values of the plurality of pixels. For example, the processing device 140A may determine the initial rendered image by mapping the plurality of target radiance values to a plurality of RGB values.

In some embodiments, the threshold count may be set according to a default setting of the image processing system 100 or preset by a user or operator via the terminal device 130. In some embodiments, the threshold count may be less than or equal to 1,500. For example, the threshold count may be 1,500, 1,000, 800, 500, 300, 100, 10, 1, etc. In such cases, since the count of ray tracing operations performed on the 3D imaging data is relatively small, the generated initial rendered image may have some noises.

In some embodiments, to determine the candidate radiance value of each pixel on the image plane during each ray tracing operation, the processing device 140A may perform a distance sampling operation on the 3D imaging data to determine one or more sampling point. The processing device 140A may determine the candidate radiance value of each pixel based on voxel values of the one or more sampling points. For example, the processing device 140A may divide the 3D imaging data into a plurality of data blocks. Each data block may include multiple voxels of the 3D imaging data. The processing device 140A may construct a plurality of homogeneous data blocks each of which correspond to one data block of the 3D imaging data to determine the candidate radiance value. More descriptions for distance sampling may be found elsewhere in the present disclosure (e.g., FIG. 8 and the descriptions thereof).

In 520, the processing device 140A (e.g., the characteristic parameter determination module 430) may obtain one or more characteristic parameters corresponding to the 3D imaging data determined by performing a ray casting operation on the 3D imaging data. As used here, the phrase "characteristic parameter" refers not only the identity of the characteristic parameter, but also the value of the characteristic parameter.

The characteristic parameter(s) may characterize color information and/or orientation information of the 3D imaging data. Exemplary color information may include RGB information, gray information, opacity information, etc. Exemplary orientation information may include depth information, normal vector information, etc. In some embodiments, the characteristic parameter(s) may include a color, a depth, a normal vector (or normal line), an opacity, etc., of each pixel on the image plane.

The ray casting operation may be similar to the ray tracing operation. For example, the ray casting operation may include casting a ray in the projection direction from the pixel to 3D imaging data. Specifically, for each pixel on the image plane, a ray may be casted in a projection direction from the pixel to the 3D imaging data. The processing device 140A may determine a color of each voxel that the ray passes through based on a first relationship between each voxel value of the 3D imaging data and one color and/or an opacity of each voxel that the ray passes through based on a second relationship between each voxel value of the 3D imaging data and one opacity. The processing device 140A may determine the color, the depth, and/or the normal vector of the pixel on the image plane based on the colors or opacities of the voxels that the ray passes through. More descriptions regarding determining the characteristic parameter(s) of the 3D imaging data may be found elsewhere in the present disclosure (e.g., FIG. 7 and the descriptions thereof).

In 530, the processing device 140A (e.g., the target rendered image generation module 440) may generate a target rendered image of the subject based on the initial rendered image and the one or more characteristic parameters using a trained image processing model. The target rendered image may have a higher image quality than the initial rendered image. In some embodiments, the target rendered image may correspond to a target count of ray tracing operations. That is, by performing the target count of ray tracing operations on the 3D imaging data, the target rendered image generation module 440 may also generate the target rendered image. In some embodiments, the target count may be greater than the threshold count.

The trained image processing model may be configured to generate a rendered image of a specific subject with relatively high image quality based on a specific rendered image of the specific subject with relatively low image quality. In other words, the processing device 140A may optimize the initial rendered image to generate the target rendered image using the trained image processing model. In some embodiments, an image quality of an image may be measured by one or more image parameters. Exemplary image parameters of an image may include a signal-to-noise ratio (SNR), an image resolution, a contrast, a brightness, or the like, or any combination thereof. An optimized image (i.e., the target rendered image) may have a lower noise, a higher contrast, a higher brightness, a higher resolution, etc., than the initial rendered image.

In some embodiments, the trained image processing model may be constructed based on a deep neural network (DNN) model, a convolutional neural network (CNN) model, a recurrent neural network (RNN) model, a feature pyramid network (FPN) model, or the like, or any combination thereof. The trained image processing model may be trained using training samples each of which includes a sample initial rendered image, one or more sample characteristic parameters corresponding to the sample initial rendered image, and a reference rendered image corresponding to the sample initial rendered image and having a higher image quality than the corresponding sample initial rendered image.

In some embodiments, the processing device 140A may retrieve the trained image processing model from the storage device 150, the terminal device 130, or any other storage device. For example, the trained image processing model may be obtained by training a preliminary model offline using a processing device (e.g., the processing device 140B, an external device of the image processing system 100) different from or same as the processing device 140A. The processing device may store the trained image processing model in the storage device 150, the terminal device 130, or any other storage device. The processing device 140A may retrieve the trained image processing model from the storage device 150, the terminal device 130, or any other storage device in response to receipt of a request for image processing. More descriptions regarding the training of the preliminary model may be found elsewhere in the present disclosure (e.g., FIG. 6 and the descriptions thereof).

The processing device 140A may input the initial rendered image and the one or more characteristic parameters into the trained image processing model to determine the target rendered image. For example, the trained image processing model may perform operations including feature extraction, pooling, normalization, etc., on the initial rendered image and/or the characteristic parameter(s) to output the target rendered image.

In some embodiments, the processing device 140A may perform a post-processing operation on the target rendered image. The processing device 140A may transmit the processed target rendered image to a terminal device (e.g., the terminal device 130) for display. For example, the processing device 140A may perform a tone mapping operation on the target rendered image based on preset mapping relationships between colors (or values corresponding to colors) and pixel values to determine a mapped image and display the mapped image on the terminal device. In some embodiments, the target rendered image may be mapped to the terminal device according to parameters including a contrast, a display degree, a color range, etc., of a display screen of the terminal device. For example, the color values of the target rendered image may be in a range of 0-100, and the color values of the display screen of the terminal device may be in a range of 0-500. The processing device 140A may map color values of 0-100 to 0-500. The processing device 140A may display the mapped image having a color range of 0-500 on the terminal device. It should be noted that in the embodiment since the target rendered image can be tone mapped and displayed, it is convenient for a user (e.g., a doctor) to observe the generated image, so as to better process and analyze the generated image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be omitted and/or one or more additional operations may be added. For example, one or more other optional operations (e.g., a characteristic parameter determination operation, a model obtaining operation, etc.) may be added.

Figure 6:
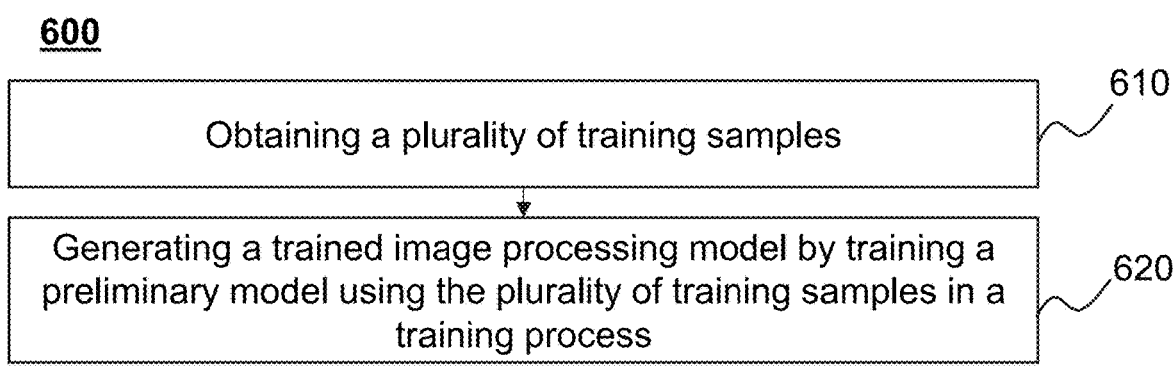
FIG. 6 is a flowchart illustrating an exemplary process for generating a trained image processing model according to some embodiments of the present disclosure.

FIG. 6 is a flowchart illustrating an exemplary process for generating a trained image processing model according to some embodiments of the present disclosure. In some embodiments, a process 600 may be implemented as a set of instructions (e.g., an application) stored in the storage device 150, the storage 220, or the storage 390. The processing device 140B (e.g., implemented on the processing device 140, the processor 210, the CPU 340, one or more modules illustrated in FIG. 4B, or an external device of the image processing device 100) may execute the set of instructions, and when executing the instructions, the processing device 140B may be configured to perform the process 600. The operations of the illustrated process 600 presented below are intended to be illustrative. In some embodiments, the process 600 may be accomplished with one or more additional operations not described, and/or without one or more of the operations discussed. Additionally, the order of the operations of the process 600 illustrated in FIG. 6 and described below is not intended to be limiting. In some embodiments, the trained image processing model described in connection with operation 530 in FIG. 5 may be obtained according to the process 600. In some embodiments, the process 600 may be performed by another device or system other than the image processing system 100, e.g., a device or system of a vendor of a manufacturer. For illustration purposes, the implementation of the process 600 by the processing device 140B is described as an example.

In 610, the processing device 140B (e.g., the acquisition module 450) may obtain a plurality of training samples. Each training sample may include a sample initial rendered image, one or more sample characteristic parameters corresponding to the sample initial rendered image, and a reference rendered image corresponding to the sample initial rendered image and having a higher image quality than the corresponding sample initial rendered image. In some embodiments, at least a portion of the training samples may be retrieved from a storage device (e.g., the storage device 150) disclosed elsewhere in the present disclosure. For example, the storage device may include a database, multiple training samples may be previously generated and stored in the database. The processing device 140B may retrieve the multiple training samples from the database.

In some embodiments, the determination of the sample initial rendered image and/or the reference rendered image of a training sample may be similar to the determination of the initial rendered image as described in FIG. 5. Specifically, for a training sample, the sample initial rendered image of the training sample may be generated by performing a first count of ray tracing operations on sample 3D imaging data acquired by a sample imaging device scanning a sample subject. The corresponding reference rendered image may be generated by performing a second count of ray tracing operations on the sample 3D imaging data. The second count may be greater than the first count. For example, the first count may be less than or equal to 1500 (e.g., 1,500, 1,000, 800, 500, 100, 10, etc.). The second count may be greater than or equal to 10,000 (e.g., 20,000, 50,000, 100,000, 200,000, 250,000, etc.). In such cases, the reference rendered image may have a higher image quality (e.g., measured by one or more image parameters as described in connection with FIG. 5) than the corresponding sample initial rendered image. In some embodiments, different sample initial rendered image generated by performing different counts of ray tracing operations may correspond to a same reference rendered image.

In some embodiments, the processing device 140B may determine the reference rendered image based on a difference between two rendered images corresponding to two consecutive ray tracing operations (i.e., a previous ray tracing operation and a current ray tracing operation). As used herein, a rendered image corresponding to the i-th ray tracing operation may refer to an image generated by performing ray tracing operations on the sample 3D imaging data i times. For example, a rendered image corresponding to the $500^{th}$ ray tracing operation (e.g., the previous ray tracing operation) may be generated by performing 500 ray tracing operations on the sample 3D imaging data. A rendered image corresponding to the $501^{th}$ ray tracing operation (e.g., the current ray tracing operation) may be generated based on the results of the 500 ray tracing operations and a result of the $501^{th}$ ray tracing operation. The processing device 140B may determine a difference between each pixel of a previous rendered image corresponding to the previous ray tracing operation and one corresponding pixel of a current rendered image corresponding to the current ray tracing operation. The processing device 140B may determine whether the difference between each pixel of the previous rendered image and the corresponding pixel of the current rendered image is less than a preset threshold (e.g., 10 Le).

In response to a determination that the difference is less than the preset threshold, the processing device 140B may designate any one of the previous rendered image or the current rendered image as the reference rendered image. In response to a determination that the difference is not less than the preset threshold, the processing device 140B may continue to perform an additional ray tracing operation on the sample 3D imaging data to update the current rendered image until a difference between each pixel of an updated previous rendered image and one corresponding pixel of the updated current rendered image is less than the preset threshold. In some embodiments, the processing device 140B may further determine the corresponding sample characteristic parameter(s) by performing a ray casting operation on the sample 3D imaging data. More descriptions regarding the determining the sample characteristic parameter(s) of the sample 3D imaging data may be found elsewhere in the present disclosure (e.g., FIG. 7 and the descriptions thereof).

In some embodiments, different training samples may correspond to different sample subjects. For example, the sample subject of one training sample may be the head, while the sample subject of another training sample may be the heart. In some embodiments, the sample subject of a training sample may be of the same type as or a different type from the subject as described in connection with operation 510 in FIG. 5. As used herein, two subjects are deemed to be of a same type when they belong to a same type of organ or tissue. For example, the subject may be the head of a patient, and the sample subject may be the head of another patient or a phantom of a human head.

In some embodiments, different sample initial rendered images (or reference rendered images) of different training samples may have different modalities. As used herein, a modality of a specific image (e.g., the sample initial rendered image, or the initial rendered image described in FIG. 5) of a specific subject may be defined by an imaging device acquiring the specific image (or 3D imaging data corresponding to the specific image). Different images of a same subject acquired by different imaging devices may correspond to different modalities. For example, an MR image of a specific subject obtained by an MRI device may be considered of a different modality than a PET image of the specific subject obtained by a PET device. In some embodiments, the modality of a sample initial rendered image may be of the same type as or a different type from the modality of the initial rendered image as described in connection with operation 510 in FIG. 5. That is, the sample imaging device may be different from the imaging device. For example, the sample imaging device may be an MRI device, and the imaging device illustrated in FIG. 5 may be a PET device.

In 620, the processing device 140B (e.g., the model determination module 460) may generate a trained image processing model by training a preliminary model using the training samples in a training process. In some embodiments, the preliminary model may include a deep neural network (DNN) model, a convolutional neural network (CNN) model, a recurrent neural network (RNN) model, a feature pyramid network (FPN) model, or the like, or any combination thereof.

In some embodiments, the preliminary model may include a plurality of parameters, such as architecture parameters, learning parameters, etc. The plurality of parameters may also be referred to as training parameters. One or more parameter values of the plurality of parameters (e.g., the learning parameters) may be altered during the training of the preliminary model using the training samples. The parameter values of the plurality of parameters may be initialized, set, and/or adjusted before the training of the preliminary model to obtain an initialized preliminary model. Exemplary parameters of the preliminary model may include the size of a kernel of a layer, the total count (or number) of layers, the count (or number) of nodes in each layer, a learning rate, a batch size, an epoch, a connected weight between two connected nodes, a bias vector relating to a node, etc.

The preliminary model may be trained based on the training samples using a training algorithm. Exemplary training algorithms may include a gradient descent algorithm, Newton's algorithm, a Quasi-Newton algorithm, a Levenberg-Marquardt algorithm, a conjugate gradient algorithm, or the like, or any combination thereof. In some embodiments, the trained image processing model may be obtained by performing a plurality of iterations to iteratively update one or more parameter values of the preliminary model (or an intermediate model). Before the plurality of iterations, the parameter values of the preliminary model may be initialized. For example, the connected weights and/or the bias vector of nodes of the preliminary model may be initialized to be random values in a range, e.g., the range from −1 to 1. As another example, all the connected weights of the preliminary model may have the same value in the range from −1 to 1, for example, 0. As still an example, the bias vector of nodes in the preliminary model may be initialized to be random values in a range from 0 to 1. In some embodiments, the parameter values of the preliminary model may be initialized based on a Gaussian random algorithm, a Xavier algorithm, etc.

In some embodiments, the training process may include a plurality of iterations. The sample initial rendered image and the corresponding sample characteristic parameter(s) in each training sample may serve as inputs of the training process. The reference rendered image in the training sample may serve as a reference output of the training process. During the training process, a prediction output corresponding to the sample initial rendered image may be determined. The processing device 140B may generate the trained image processing model based on a difference between the prediction output and the corresponding reference rendered image.

In some embodiments, during an iteration of the plurality of iterations, the processing device 140B may input at least one sample initial rendered image and the corresponding sample characteristic parameter(s) into an intermediate model. The intermediate model may output at least one prediction output corresponding to the at least one sample initial rendered image. The intermediate model may be the preliminary model in the first iteration of the plurality of iterations, or an updated model generated in a previous iteration. The processing device 140B may determine whether a termination condition is satisfied. The termination condition may provide an indication of whether the preliminary model is sufficiently trained. In response to a determination that the termination condition is satisfied, the processing device 140B may designate the intermediate model as the trained image processing model. On the other hand, in response to a determination that the termination condition is not satisfied, the processing device 140B may update the parameter values of the intermediate model until the termination condition is satisfied.

In some embodiments, the termination condition may relate to a loss function or an iteration count of the plurality of iterations (or training process). For example, the termination condition may be satisfied if the value of the loss function associated with the preliminary model is minimal or smaller than a threshold (e.g., a constant). As another example, the termination condition may be satisfied if the value of the loss function converges. The convergence may be deemed to have occurred if the variation of the values of the loss function in two or more consecutive iterations is smaller than a threshold (e.g., a constant). As still an example, the termination condition may be satisfied when a specified number (or count) of iterations are performed in the training process.

In some embodiments, the processing device 140B may determine the value of the loss function based on the prediction output and the reference rendered image. In some embodiments, the loss function may include a first term related to a first difference between each pixel value (e.g., an RGB value) of the prediction output and the corresponding pixel value of the reference rendered image and/or a second term related to a second difference between a gradient of each pixel value (e.g., an RGB value) of the prediction output and a gradient of the corresponding pixel value of the reference rendered image. In some embodiments, the first difference and/or the second difference may include a variance, a standard deviation, a mean square error, etc.

In some embodiments, the preliminary model may include a convolutional auto-encoder including an encoder, a decoder, etc. The encoder may be configured to compress input data of the preliminary model and extract features of the input data. For example, for each training sample, the encoder may perform convolution and pooling on the inputted sample initial rendered image (e.g., the RGB value of each pixel of the sample initial rendered image) and the corresponding sample characteristic parameter(s) to achieve input data compression and feature extraction. The decoder may include a residual network (e.g., using skip connections) and be configured to determine the prediction output.

According to some embodiments of the present disclosure, since the sample initial rendered image in each training sample can be obtained through a small count of ray tracing operations, the sample initial rendered image can be quickly obtained. As a result, during the use of the trained image processing model, a target rendered image with relatively high image quality may be generated by inputting an initial rendered image with a relatively low image quality that can be obtained quickly, thereby increasing the overall medical image rendering speed. In addition, since the sample characteristic parameter(s) other than the sample initial rendered image are used as additional inputs for training the preliminary model, the trained image processing model may extract more information of the sample 3D imaging data, which may further improve the performance of the trained image processing model.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. For example, after the trained image processing model is generated, the processing device 140B may further test the trained image processing model using a set of testing samples. Additionally or alternatively, the processing device 140B may update the trained image processing model periodically (e.g., per month, per two months) or irregularly based on one or more newly-generated training samples.

In some embodiments, in order to meet different interaction requirements, the processing device 140B may process the sample 3D imaging data to generate a training sample including a plurality of consecutive sample initial rendered images, one or more characteristic parameters of the sample 3D imaging data, and corresponding consecutive reference rendered images. For example, for a translation process, the processing device 140B may determine the consecutive sample initial rendered images and the corresponding consecutive reference rendered images corresponding to the translation process by moving the image plane up and down or left and right. As another example, for a zooming process, the processing device 140B may determine the consecutive sample initial rendered images and the corresponding consecutive reference rendered images corresponding to the zooming process by moving the image plane back and forth. As a further example, for a window-leveling process, the processing device 140B may determine the consecutive sample initial rendered images and the corresponding consecutive reference rendered images corresponding to the translation process by adjusting a resolution and/or location corresponding the image plane (also be referred to as a window width and/or a window center of a window). Correspondingly, during the training of the preliminary model, the loss function may further include a third term related to a third difference between the prediction outputs and the corresponding reference rendered images in the time domain.

Figure 7:
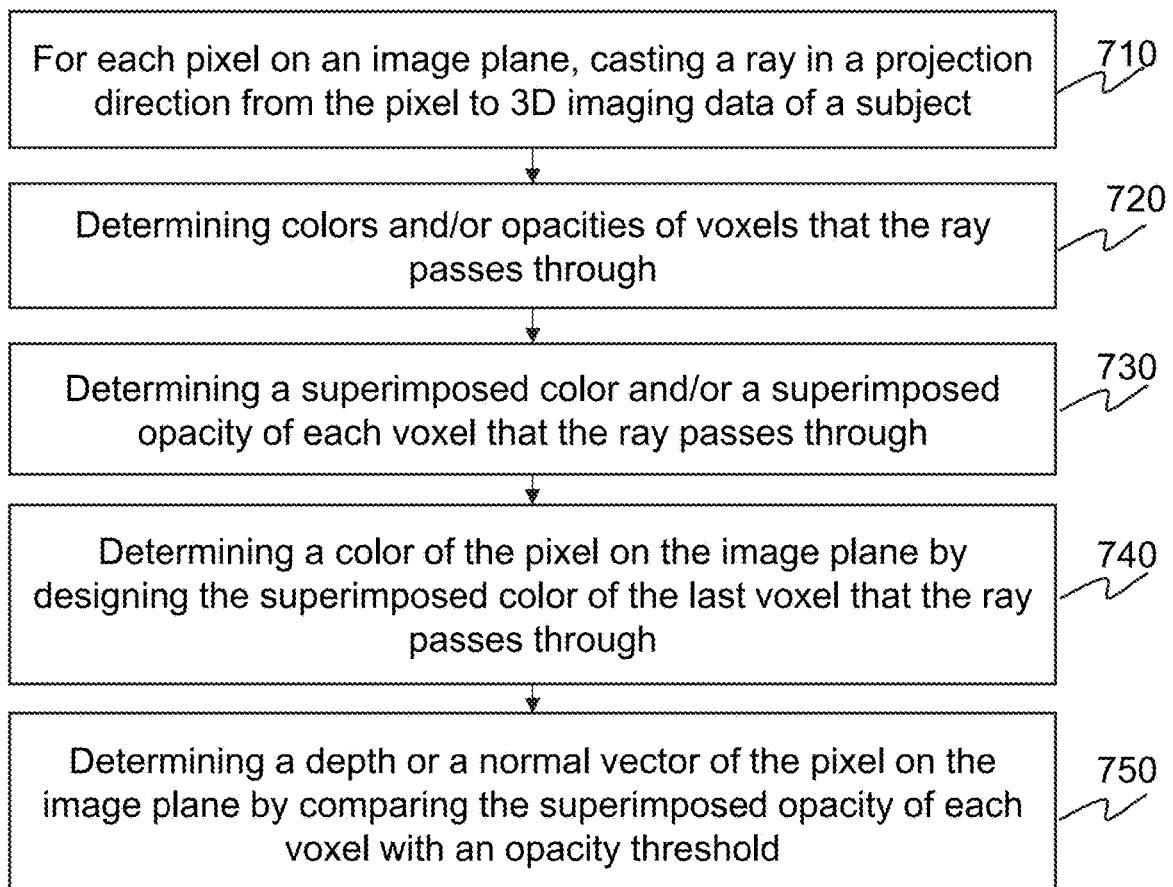
FIG. 7 is a flowchart illustrating an exemplary process for determining characteristic parameters of 3D imaging data according to some embodiments of the present disclosure.

FIG. 7 is a flowchart illustrating an exemplary process for determining characteristic parameters of 3D imaging data according to some embodiments of the present disclosure. In some embodiments, a process 700 may be implemented as a set of instructions (e.g., an application) stored in the storage device 150, the storage 220, or the storage 390. The processing device 140A (e.g., the processor 210, the CPU 340) may execute the set of instructions, and when executing the instructions, the processing device 140A may be configured to perform the process 700. The operations of the illustrated process 700 presented below are intended to be illustrative. In some embodiments, the process 700 may be accomplished with one or more additional operations not described, and/or without one or more of the operations discussed. Additionally, the order of the operations of the process 700 illustrated in FIG. 7 and described below is not intended to be limiting. In some embodiments, one or more operations of the process 700 may be performed to achieve at least part of operation 520 as described in connection with FIG. 5 and/or operation 610 as described in connection with FIG. 6. In some embodiments, the process 700 may be performed by another device or system other than the image processing system 100.

In 710, for each pixel on an image plane, the processing device 140A (e.g., the acquisition module 410) may cast a ray in a projection direction from the pixel to 3D imaging data of a subject. The 3D imaging data may include a plurality of voxels with voxel values, e.g., luminance values, gray values, colors (or RGB values), saturation values, etc.

In 720, for each pixel on the image plane, the processing device 140A (e.g., the characteristic parameter determination module 430) may determine colors and/or opacities of voxels that the ray passes through.

Specifically, the processing device 140A may determine a color and/or an opacity of each voxel that the ray passes through based on voxel values of the voxels. For example, the processing device 140A may determine the color of each voxel based on a first relationship between each voxel value (e.g., a gray value) of the corresponding voxel and one color. Similarly, the processing device 140A may determine the opacity of each voxel based on a second relationship between each voxel value (e.g., a gray value) of the corresponding voxel and one opacity.

In some embodiments, the first relationship and/or the second relationship may be stored in a database. The processing device 140A may retrieve the first relationship and/or the second relationship from the database. The processing device 140A may determine a color or opacity of a specific voxel based on the first relationship or the second relationship and a specific voxel value of the specific voxel. In some embodiments, the first relationship and/or the second relationship may be denoted as a table. In some embodiments, the first relationship and/or the second relationship may be denoted as a function or model. The function or model may be used to generate the color or opacity of the voxel based on the voxel value of the voxel.

In 730, for each pixel on the image plane, the processing device 140A (e.g., the characteristic parameter determination module 430) may determine a superimposed color and/or a superimposed opacity of each voxel that the ray passes through.

For a current voxel that the ray passes through, the processing device 140A may determine the superimposed color of the current voxel based on a current color of the current voxel and previous colors of previous voxels. Specifically, for the current voxel that the ray passes through, the processing device 140A may determine the superimposed color of the current voxel by superimposing the current color of the current voxel and previous colors of previous voxels. As used herein, the previous voxels corresponding to the current voxel may be voxels before the current voxel along the projection direction of the ray. In some embodiments, the processing device 140A may determine the superimposed color of the current voxel by assigning a first weight to the current color of the current voxel. For example, the superimposed color of the current voxel may be determined according to Equation (1) as follows:

$$C'_{dst} = C''_{dst} + (1 - \alpha''_{dst})C_{src}, \qquad (1)$$

where $$C'_{dst}$$

denotes the superimposed color of the current voxel, $$C''_{dst}$$

denotes the superimposed color of the previous voxel, $C_{src}$ denotes the color of the current voxel, and $$\alpha''_{dst}$$

denotes the superimposed opacity of the previous voxel, $$(1 - \alpha''_{dst})$$

may also be referred to as the first weight.

Similarly, for the current voxel, the processing device 140A may determine the superimposed opacity of the current voxel based on a current opacity of the current voxel and previous opacities of previous voxels. Specifically, for the current voxel, the processing device 140A may determine the superimposed opacity of the current voxel by superimposing a current opacity of the current voxel and previous opacities of previous voxels. In some embodiments, the processing device 140A may determine the superimposed opacity of the current voxel by assigning a second weight to the current opacity of the current voxel. For example, the superimposed opacity of the current voxel may be determined according to Equation (2) as follows:

$$\alpha'_{dst} = \alpha''_{dst} + (1 - \alpha''_{dst})\alpha_{src}, \qquad (2)$$

where $$\alpha'_{dst}$$

denotes the superimposed opacity of the current voxel, $$\alpha''_{dst}$$

denotes the superimposed opacity of the previous voxel, and $\alpha_{src}$ denotes the opacity of the current voxel, $$(1 - \alpha''_{dst})$$

may also be referred to as the second weight.

It should be noted that when the current voxel is the first voxel that the ray passes through, the superimposed color or the superimposed opacity of the previous voxel may be equal to zero. That is, the superimposed color of the first voxel may be equal to the color of the first voxel, and the superimposed opacity of the first voxel may be equal to the opacity of the first voxel.

In 740, for each pixel on the image plane, the processing device 140A (e.g., the characteristic parameter determination module 430) may determine a color of the pixel on the image plane by designating the superimposed color of the last voxel that the ray passes through. That is, the color of the pixel on the image plane may be determined by superimposing the colors of the voxels that the ray passes through.

In 750, for each pixel on the image plane, the processing device 140A (e.g., the characteristic parameter determination module 430) may determine a depth or a normal vector of the pixel on the image plane by comparing the superimposed opacity of each voxel with an opacity threshold.

In response to a determination that a maximum superimposed opacity among superimposed opacities of the voxels along the projection direction is greater than the opacity threshold (i.e., there are one or more voxels whose superimposed opacity is greater than the opacity threshold), the processing device 140A may determine a foremost voxel whose superimposed opacity is greater than the opacity threshold as a reference voxel. The processing device 140A may determine the depth and the normal vector of the pixel on the image plane based on location information (e.g., coordinates) of the reference voxel. For example, the processing device 140A may designate a depth of the foremost voxel (i.e., the reference voxel) as the depth of the pixel on the image plane. The processing device 140A may determine a normal vector of the corresponding location of the foremost voxel based on voxel values of voxels around the foremost voxel. For example, the processing device 140A may determine the normal vector of the corresponding location of the foremost voxel according to a gray gradient-based central difference technique. The processing device 140A may designate the normal vector of the corresponding location of the foremost voxel as the normal vector of the pixel on the image plane.

On the other hand, in response to a determination that the maximum superimposed opacity among superimposed opacities of the voxels along the projection direction is not greater than the opacity threshold (i.e., there is no voxel whose superimposed opacity is greater than the opacity threshold), the processing device 140A may determine the voxel with the maximum superimposed opacity as the reference voxel and determine the depth and the normal vector of the pixel on the image plane based on location information of the reference voxel. In some embodiments, the opacity threshold may be set according to a default setting of the image processing system 100 or preset by a user or operator via the terminal device 130. For example, the opacity threshold may be 80%, 85%, etc.

In some embodiments, the color, the depth, the normal vector, an opacity (e.g., the corresponding maximum opacity), etc., of each pixel on the image plane determined by performing the ray casting operation on the 3D imaging data may also be referred to as characteristic parameter(s) of the 3D imaging data. The processing device 140A may store the color, the depth, the normal vector, the opacity, etc., of each pixel on the image plane into a storage device for subsequent use.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
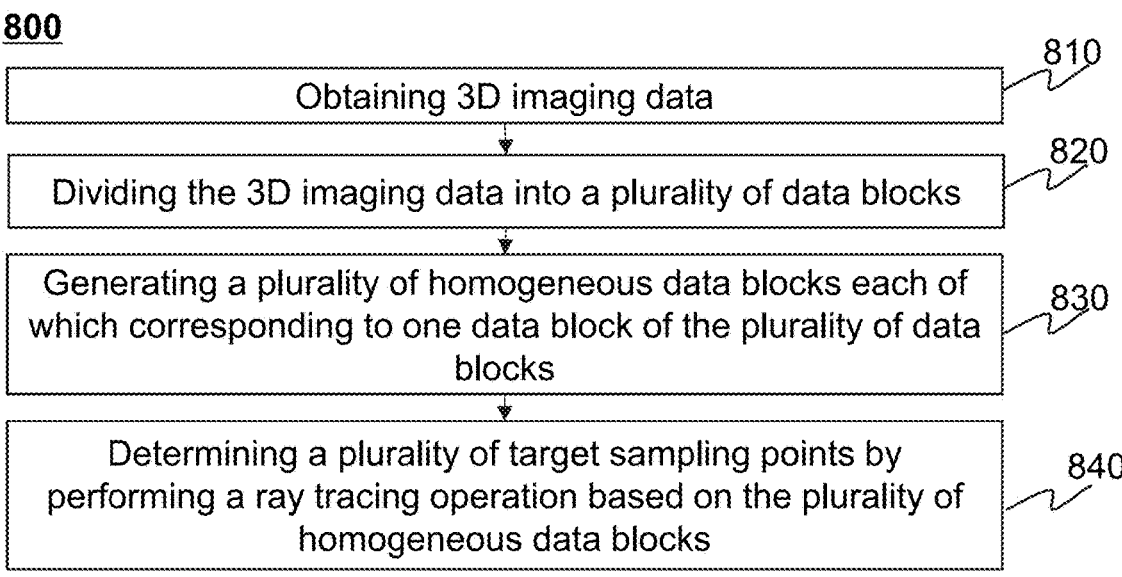
FIG. 8 is a flowchart illustrating an exemplary process for distance sampling according to some embodiments of the present disclosure.

FIG. 8 is a flowchart illustrating an exemplary process for distance sampling according to some embodiments of the present disclosure. In some embodiments, a process 800 may be implemented as a set of instructions (e.g., an application) stored in the storage device 150, the storage 220, or the storage 390. The processing device 140A (e.g., implemented on the processing device 140, the processor 210, the CPU 340, or one or more modules illustrated in FIG. 4A) may execute the set of instructions, and when executing the instructions, the processing device 140A may be configured to perform the process 800. The operations of the illustrated process 800 presented below are intended to be illustrative. In some embodiments, the process 800 may be accomplished with one or more additional operations not described, and/or without one or more of the operations discussed. Additionally, the order of the operations of the process 800 illustrated in FIG. 8 and described below is not intended to be limiting. In some embodiments, one or more operations of the process 800 may be performed to achieve at least part of operation 510 as described in connection with FIG. 5.

In 810, the processing device 140A (e.g., the acquisition module 410) may obtain 3D imaging data. In some embodiments, the 3D imaging data may be generated by an imaging device (e.g., the imaging device 110) scanning a subject. In some embodiments, the 3D imaging data may be generated by a predetermined program, such as a PET simulation program.

The 3D imaging data may include a plurality of voxels each of which has a voxel value. A first resolution of the 3D imaging data may be defined by the plurality of voxels. For example, if the 3D imaging data has 64×64×64 voxels, the first resolution of the 3D imaging data may be expressed as 64×64×64. For illustration purposes, the 3D imaging data in the present disclosure may be described as a plurality of two-dimensional (2D) grids, such as 2D grids 1000 shown in FIG. 10, 2D grids 1200 shown in FIG. 12. The first resolution of the 3D imaging data may be described as a 2D resolution. For example, the first resolution of the 3D imaging data 900 may be expressed as 16×16. It is understood that these expressions based on 2D resolution can be extended to 3D resolution.

In some embodiments, for each voxel of the plurality of voxels, the processing device 140A may determine an extinction coefficient corresponding to the voxel based on the voxel value of the voxel. For example, the processing device 140A may determine the extinction coefficient of each voxel by processing projection data (i.e., the voxel value) of the voxel based on a relationship between the extinction coefficient and the voxel value. In some embodiments, the relationship between the extinction coefficient and the voxel value may be stored as an algorithm. The processing device 140A may determine the extinction coefficient of the voxel based on the algorithm. In some embodiments, the extinction coefficient may be a linear attenuation coefficient, a mass attenuation coefficient, an atomic attenuation coefficient, an electron attenuation coefficient, etc. In some embodiments, the processing device 140A may transmit the plurality of extinction coefficients into the storage device 150 or any other storage device for storage.

In some embodiments, at least a portion of voxel values of the plurality of voxels may be different from each other. In other words, at least a portion of extinction coefficients among the plurality of extinction coefficients of the plurality of voxels may be different from each other. That is, the 3D imaging data may be un-homogeneous imaging data. In some embodiments, at least one voxel of the plurality of voxels may include multiple real particles. As used herein, a real particle refers to a substance unit that can attenuate the energy of rays. That is, the real particle may have an actual extinction coefficient unit. Extinction coefficient units of all real particles in a voxel may compose the extinction coefficient of the voxel. For example, different voxels with different extinction coefficients may have different counts of real particles.

In 820, the processing device 140A (e.g., the initial rendered image determination module 420) may divide the 3D imaging data into a plurality of data blocks. Each data block may include multiple voxels of the 3D imaging data.

Figure 10:
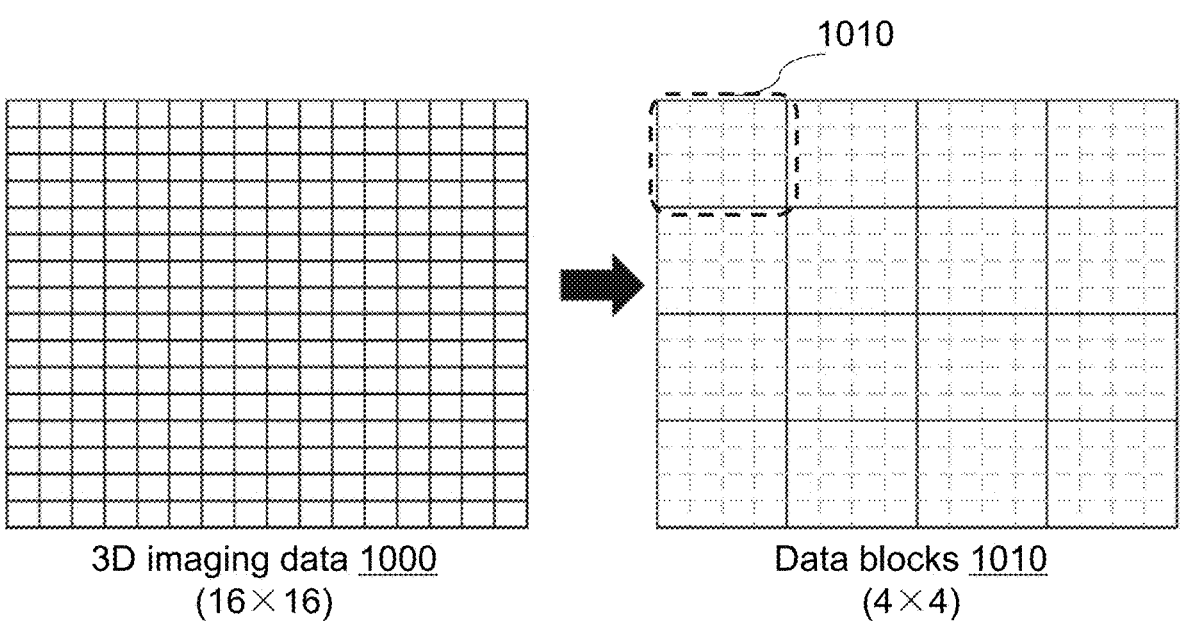
FIG. 10 is a schematic diagram illustrating a process for dividing 3D imaging data into a plurality of data blocks according to some embodiments of the present disclosure.

In some embodiments, the 3D imaging data may be divided into the plurality of data blocks according to a default setting of the image processing system 100 or divided by a user or operator via the terminal device 130. In some embodiments, the processing device 140A may randomly divide the 3D imaging data. For example, the 3D imaging data having the first resolution of 64×64 may be divided into data blocks having resolutions such as 16×16, 16×8, 8×8, 8×4, 4×4, etc. In some embodiments, the processing device 140A may divide the 3D imaging data based on the first resolution of the 3D imaging data. In some embodiments, the processing device 140A may evenly divide the 3D imaging data into the plurality of data blocks each of which has a second resolution smaller than the first resolution. For example, as shown in FIG. 10, the 3D imaging data 1000 has a resolution of 16×16. After being divided, each of the data blocks 1010 has a resolution of 4×4 and has 16 voxels. In some embodiments, the processing device 140A may randomly divide the 3D imaging data. For example, the 3D imaging data having the first resolution of 64×64 may be divided into data blocks having resolutions such as 16×16, 16×8, 8×8, 8×4, 4×4, etc.

Figure 12:
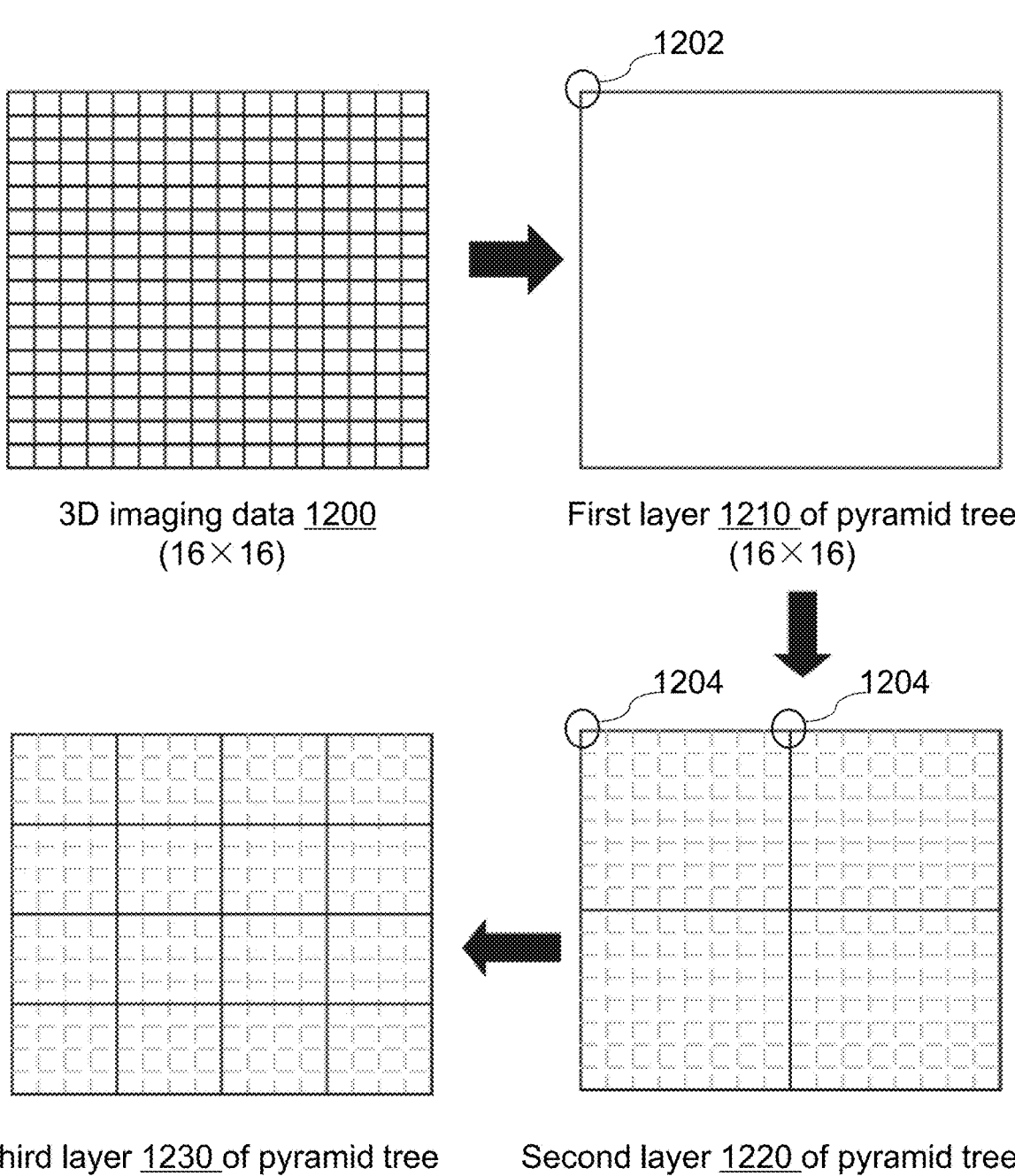
FIG. 12 is a schematic diagram illustrating a process for dividing 3D imaging data into a plurality of data blocks according to some embodiments of the present disclosure.

In some embodiments, the processing device 140A may determine a pyramid tree based on the first resolution of the 3D imaging data. The pyramid tree may include at least two layers of data blocks. Each layer of the pyramid tree may include the plurality of voxels of the 3D imaging data. In other words, each layer of the pyramid tree may include all information of the 3D imaging data. The top layer of the pyramid tree may have the first resolution. That is, the top layer of the pyramid tree may be the 3D imaging data itself. From top to bottom of the pyramid tree, a current count of data blocks in a current layer may be greater than a previous count of data blocks in a previous layer. Each data block of the current layer may have a current resolution smaller than a previous resolution of each data block of the previous layer. For example, as shown in FIG. 12, a pyramid tree illustrated in FIG. 12 may have 3 layers of data blocks. The first layer 1210 may have one data block having a first resolution of 16×16. The second layer 1220 may have 4 data blocks each of which has a second resolution of 8×8. The third layer 1230 may have 16 data blocks each of which has a third resolution of 4×4. The first resolution, the second resolution, and the third resolution may be decreased in sequence. In some embodiments, a count or number of the layers of data blocks may be set according to a default setting of the image processing system 100 or preset by a user or operator via the terminal device 130. The processing device 140A may determine a resolution (or voxels) of the data block of the bottom layer based on the count of the layers.

In some embodiments, the processing device 140A may divide the 3D imaging data according to a data block division model. The data block division model may be trained based on a plurality of groups of training data. Each group of training data may include sample 3D imaging data and a plurality of corresponding data blocks. The processing device 140A may input the 3D imaging data into the data block division model to determine the plurality of data blocks.

In 830, the processing device 140A (e.g., the initial rendered image determination module 420) may generate a plurality of homogeneous data blocks. Each homogeneous data block of the plurality of homogeneous data blocks may correspond to one data block of the plurality of data blocks. The extinction coefficient (or corrected extinction coefficient) of each voxel in each homogeneous data block may be the same.

For each data block of the plurality of data blocks, the processing device 140A may determine a maximum extinction coefficient $\sigma_{max}$ among multiple extinction coefficients of the multiple voxels in the data block. The processing device 140A may designate a virtual extinction coefficient to each voxel in the data block based on the maximum extinction coefficient to determine the corresponding homogeneous data block. In the homogeneous data block, each of the multiple voxels may have the maximum extinction coefficient.

Specifically, the processing device 140A may select intermediate voxels whose extinction coefficient is not the maximum extinction coefficient in each data block. For example, if a data block includes 8 voxels of P1-P8 and the extinction coefficient of voxel P5 is the maximum extinction coefficient of the data block, some or all of the voxels P1-P4 and P6-P8 may be the intermediate voxels. The processing device 140A may designate a virtual extinction coefficient to each intermediate voxel in the data block to make a corrected extinction coefficient of the intermediate voxel equal to the maximum extinction coefficient. For example, the processing device 140A may add virtual particles to each intermediate voxel in the data block to make a corrected extinction coefficient of the intermediate voxel equal to the maximum extinction coefficient. As used herein, a virtual particle refers to an additional non-real substance unit that can attenuate the energy of rays. That is, the virtual particle may have a virtual extinction coefficient unit. Virtual extinction coefficient units of all virtual particles added in an intermediate voxel may compose the virtual extinction coefficient $\sigma_{virtual}$ of the intermediate voxel and extinction coefficient units of all real particles existing in the intermediate voxel may compose the real extinction coefficient $\sigma_{real}$ of the intermediate voxel, wherein $\sigma_{virtual} + \sigma_{real} = \sigma_{max}$. For example, a specific voxel having the maximum extinction coefficient in a specific data block may have $X_1$ real particles. For an intermediate voxel in the specific data block having $X_2$ ($X_2 < X_1$) real particles. The processing device 140A may add ($X_1 - X_2$) virtual particles to make the corrected extinction coefficient of the intermediate voxel equal to the maximum extinction coefficient. For one or more voxels having the maximum extinction coefficient in the specific data block, the processing device 140A may not add virtual particles to these voxels. In other words, a virtual extinction coefficient designated to each of the one or more voxels having the maximum extinction coefficient may be 0.

In some embodiments, for a pyramid tree including multiple layers of data blocks, the processing device 140A may first determine a maximum extinction coefficient of each data block of the bottom layer. Then the processing device 140A may determine a maximum extinction coefficient of each data block in the penultimate layer of the pyramid tree based on maximum extinction coefficients of data blocks in the bottom layer. The processing device 140A may determine a maximum extinction coefficient of each data block in an upper layer of the penultimate layer in a manner similar to determining the maximum extinction coefficient of each data block in the penultimate layer. That is, the processing device 140A may recursively determine a maximum extinction coefficient of each data block in each layer of the pyramid tree from bottom to top.

In some embodiments, in response to a trigger condition being satisfied, the processing device 140A may automatically add the virtual particles to each voxel in each data block to generate the plurality of homogeneous data blocks. In some embodiments, the trigger condition may include a signal indicating that the plurality data blocks have been generated, a trigger instruction inputted by a user, for example, via the terminal device 130, etc.

In 840, the processing device 140A (e.g., the initial rendered image determination module 420) may determine a plurality of target sampling points by performing a ray tracing operation based on the plurality of homogeneous data blocks. In some embodiments, the processing device 140A may further determine a plurality of candidate radiance values each of which corresponds to a pixel on an image plane based on the plurality of target sampling points. In some embodiments, the processing device 140A may perform multiple ray tracing operations on the 3D imaging data to determine an initial rendered image as described in connection with operation 510 in FIG. 5.

In some embodiments, during the ray tracing operation, a ray may be casted in a projection direction from each pixel on an image plane to the plurality of homogeneous data blocks (i.e., the 3D imaging data). It should be noted that a propagation path of a ray in a homogeneous data block may be a straight line. In such cases, the processing device 140A may determine a path (e.g., paths R1-R4 should in FIG. 9) of the ray casted in the ray tracing operation. The processing device 140A may determine a length of a sampling path (also be referred to as a sampling path length) on the path based on the maximum extinction coefficient of an intermediate homogeneous data block corresponding to an intermediate starting point. The intermediate starting point may be a starting point of the ray on the 3D imaging data (i.e., the first intersection point between the ray and the 3D imaging data) or a previous candidate sampling point. In some embodiments, the intermediate starting point may be a point where the pixel (or a light source) is located. The intermediate homogeneous data block may be a current homogeneous data block to which the intermediate starting point belongs. The processing device 140A may determine a current candidate sampling point based on the sampling path length. The processing device 140A may determine whether the current candidate sampling point is a real particle. In response to a determination that the current candidate sampling point is the real particle, the processing device 140A may designate the current candidate sampling point as a target sampling point. In other words, the distance sampling is successful.

On the other hand, in response to a determination that the current candidate sampling point is a virtual particle, the processing device 140A may designate the current candidate sampling point as an updated starting point. The processing device 140A may determine an updated candidate sampling point from the updated starting point without changing the projection direction of the ray. The processing device 140A may determine whether the updated candidate sampling point is the target sampling point in a similar manner as described above. It should be noted that the processing device 140A may iteratively determine updated starting points and updated candidate sampling points until the target sampling point is determined or the sampling path on the ray penetrates out of the 3D imaging data.

In some embodiments, whether the current candidate sampling point is a real particle may be determined based on a location of the current candidate sampling point. In some embodiments, the processing device 140A may determine the location of the current candidate sampling point by simulating the intersection of the ray and the homogeneous data blocks. Specifically, for each pixel on the image plane, the processing device 140A may determine the intersection points between the ray and the homogeneous data block(s). The processing device 140A may determine one or more step distances based on each distance between every two adjacent intersection points. In some embodiments, the step distance may also be referred to as an optical thickness. The processing device 140A may determine a target homogeneous data block to which the current candidate sampling point belongs based on the one or more step distances. The processing device 140A may determine the location of the current candidate sampling point in the target homogeneous data block. More descriptions regarding determining a location of a current candidate sampling point may be found elsewhere in the present disclosure (e.g., FIG. 11 and the descriptions thereof).

Figure 13:
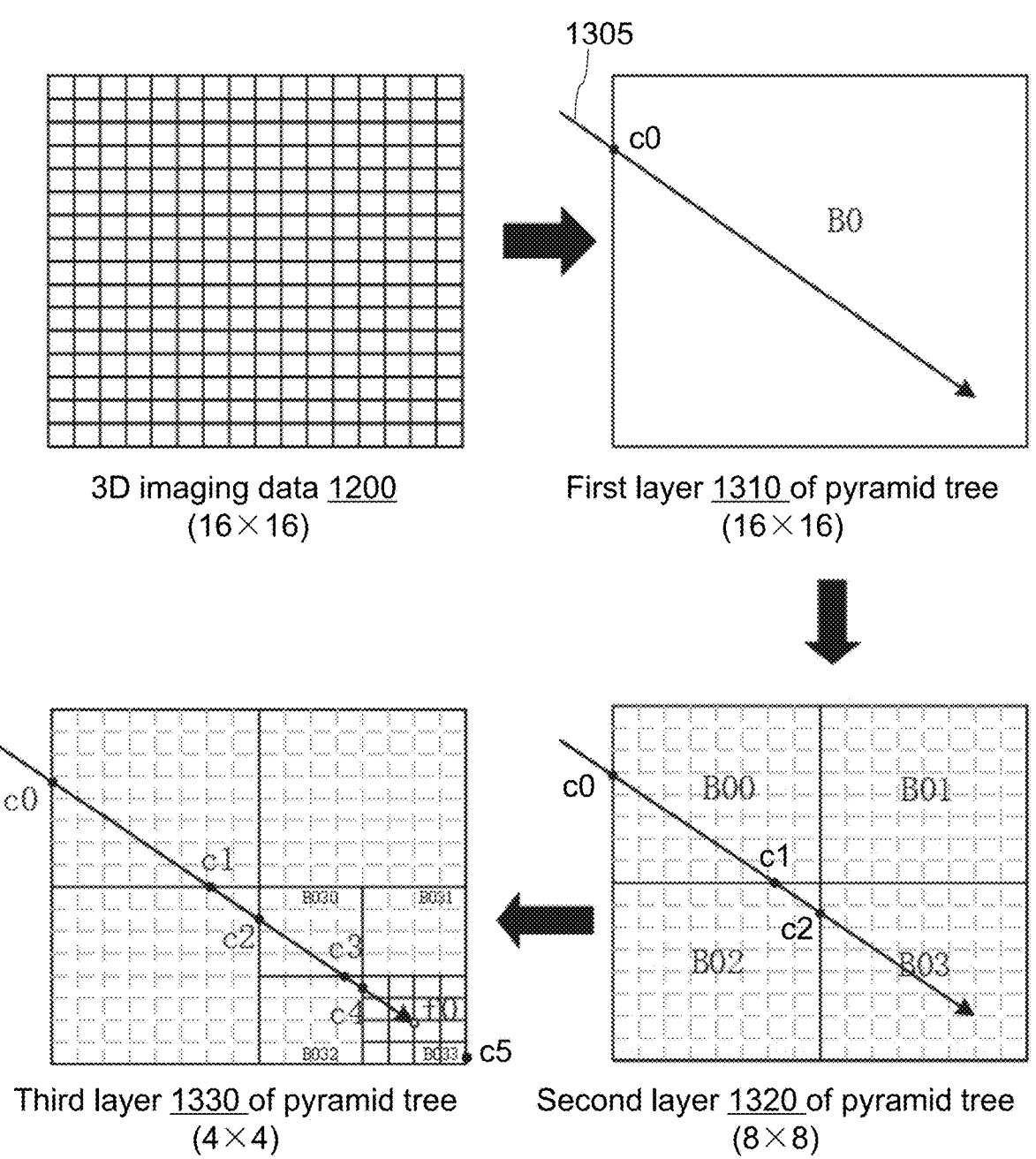
FIG. 13 is a schematic diagram of the intersection of a ray and at least a portion of homogeneous data blocks of a pyramid tree according to some embodiments of the present disclosure.

In some embodiments, when the plurality of data blocks form a pyramid tree, the processing device 140A may determine the intersection points by performing a recursive operation on homogeneous data block(s) of each layer of the 3D imaging data from top to bottom of the pyramid tree. As used herein, the recursive operation may refer to an operation that is performed a specific number of times where a result of a previous iteration of the recursive operation is used as an operand of a subsequent iteration of the recursive operation. For example, as shown in FIG. 13, for the first layer 1310 of a pyramid tree of 3D image data 1200, the processing device 140A may determine an intersection point c0 by calculating the intersection between the ray and the homogeneous data block in the first layer 1310. Then the processing device 140A may determine intersection points c1 and c2 by calculating the intersection between the ray and the homogeneous data blocks in the second layer 1320. The processing device 140A may further determine intersection points c3, c4, and c5 by calculating the intersection between the ray and the homogeneous data blocks in the third layer 1330.

In some embodiments, whether the current candidate sampling point is the real particle may be determined based on a determination probability that a particle at the location of the current candidate sampling point is a real particle. For example, the processing device 140A may generate a random number using a random function. If the random number is greater than the determination probability, the processing device 140A may determine that the current candidate sampling point is the real particle. On the other hand, if the random number is not greater than the determination probability, the processing device 140A may determine that the current candidate sampling point is the virtual particle.

In some embodiments, the processing device 140A may determine a candidate voxel corresponding to the location of the current candidate sampling point. The processing device 140A may designate a probability that a particle in the candidate voxel is a real particle as the determination probability. For example, if the candidate voxel in a homogeneous data block includes 6 real particles and 10 virtual particles, a probability that a particle in such voxel is a virtual particle (also referred to as a virtual probability of the candidate voxel) may be determined as 10/(10+6)=5/8, and a probability that a particle in such voxel is a real particle (also referred to as a real probability of the candidate voxel) may be determined as 6/(10+6)=3/8. As another example, the real probability and the virtual probability of the candidate voxel may be determined respectively according to Equations (3) and (4) as follows:

$$P_{real}(s) = \frac{\sigma_{real}(s)}{\sigma_{max}(s)} \qquad (3)$$

$$P_{virtual}(s) = \frac{\sigma_{virtual}(s)}{\sigma_{max(s)}} \qquad (4)$$

where $P_{real}(s)$ denotes the real probability of the current candidate sampling point (or candidate voxel), $\sigma_{real}(s)$ denotes the real extinction coefficient of the current candidate sampling point (or candidate voxel), $\sigma_{max(s)}$ denotes the maximum extinction coefficient of the homogeneous data block where the current candidate sampling point is located, $P_{virtual}(s)$ denotes the real probability of the current candidate sampling point (or candidate voxel), and $\sigma_{virtual}(S)$ denotes the virtual extinction coefficient of the current candidate sampling point (or candidate voxel). It should be noted that a real probability of a voxel without virtual particles may be determined as a constant of 1.

In some embodiments, the processing device 140A may predetermine the real probability and the virtual probability of each voxel of the 3D imaging data. The processing device 140A may store the first probability and the second probability of each voxel to a storage device (e.g., the storage device 150) for retrieval and use. The processing device 140A may directly retrieve the determination probability from the storage device.

According to some embodiments of the present disclosure, the pyramid tree may be generated by dividing the 3D imaging data to different dimensional resolutions of data blocks, wherein the closer the data blocks to the top layer of the pyramid tree, the larger the dimension (or resolution) of the data block. In such cases, especially for 3D imaging data having a relatively high resolution, using the pyramid tree to introduce data blocks having different dimensional resolutions for distance sampling may further increase the speed of the distance sampling algorithm.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
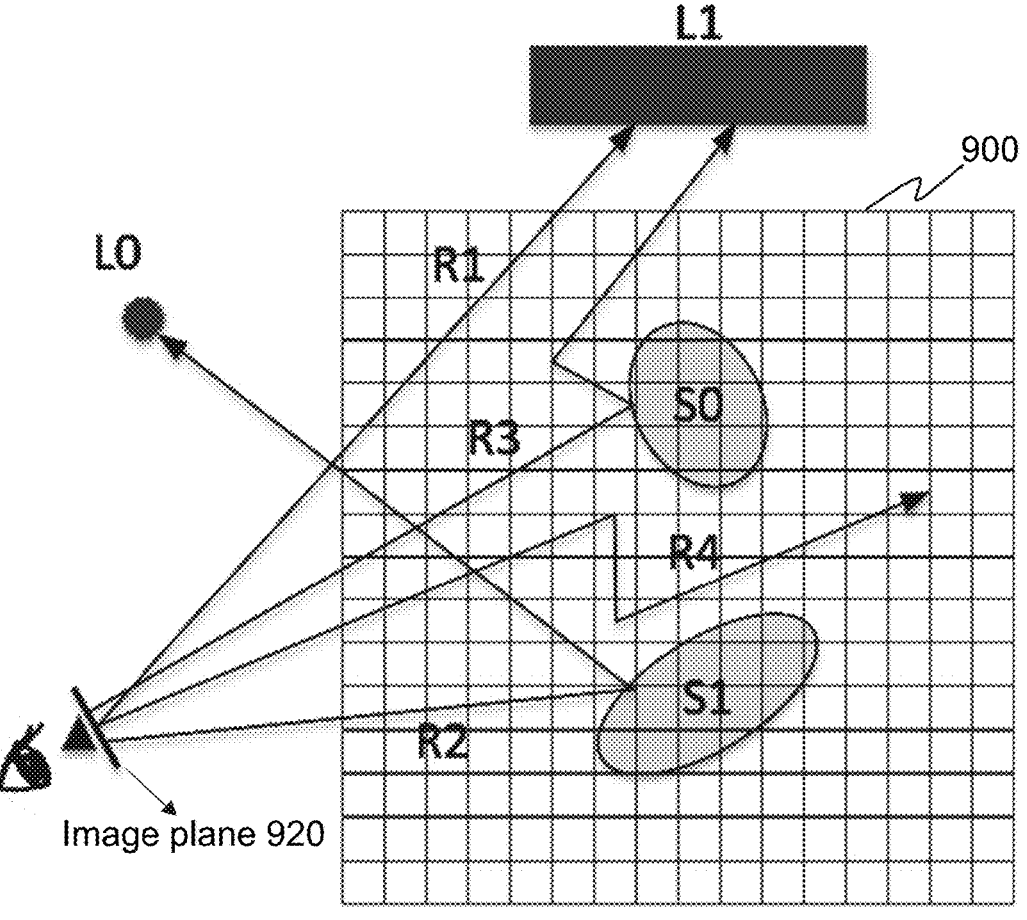
FIG. 9 is a schematic diagram illustrating exemplary paths of rays after the ray is incident on 3D imaging data according to some embodiments of the present disclosure.

FIG. 9 is a schematic diagram illustrating exemplary paths of rays after the ray is incident on 3D imaging data according to some embodiments of the present disclosure. As shown in FIG. 9, two-dimensional (2D) grids 900 may represent 3D imaging data of a subject. Ellipse S0 may represent a surface of a first medium (also referred to as a first medium surface, e.g., a surface of a bone in a patient) of the subject and ellipse S1 may represent a surface of a second medium (also referred to as a second medium surface) of the subject. Spot L0 may represent a point light source and box L1 may represent an area light source. In some embodiments, different rays may be casted in different projection directions from different pixels on the image plane 920 to the 3D imaging data 900. In some embodiments, for a same pixel on the image plane 920, different ray tracing operations may correspond to different paths. Lines R1, R2, R3, and R4 may represent different paths of rays after being incident on the 3D imaging data, respectively.

Specifically, line R1 may represent a path corresponding to direct irradiation. That is, a ray on a light source (e.g., the area light source L1) may reach a scattering point in the 3D imaging data 900 after being attenuated by the 3D imaging data, and a light propagation direction of the ray may not change. In such cases, a distance sampling operation may require to be performed from the scattering point to the light source. In some embodiments, the light source may include but be not limited to a point light source, an area light source, an environment map light source, etc. Lines R2 and R3 may represent paths of rays reaching a next scattering point after being reflected on the second medium surface S1 or first medium surface S0, respectively. Path R3 may indicate that the ray is also scattered in the subject. During such paths, a distance sampling operation may require to be performed. In some embodiments, a reflection direction of the reflecting process may be determined using a bidirectional surface reflection function (BSDF). Line R4 may represent a path of a ray reaching the next scattering point after being scattered by a certain scattering point in the subject. In such cases, a distance sampling operation may require to be performed. In some embodiments, a scattering direction and probability may be determined using a phase function.

FIG. 10 is a schematic diagram illustrating a process for dividing 3D imaging data into a plurality of data blocks according to some embodiments of the present disclosure. As shown in FIG. 10, 3D imaging data 1000 may include a first resolution of 16×16. In some embodiments, the 3D imaging data 1000 may be divided into a plurality of data blocks each of which has a second resolution smaller than the first resolution. For example, the 3D imaging data 1000 may be evenly divided into 16 data blocks 1010. Each data block 1010 may have the second resolution of 4×4, and have 16 voxels.

Figure 11:
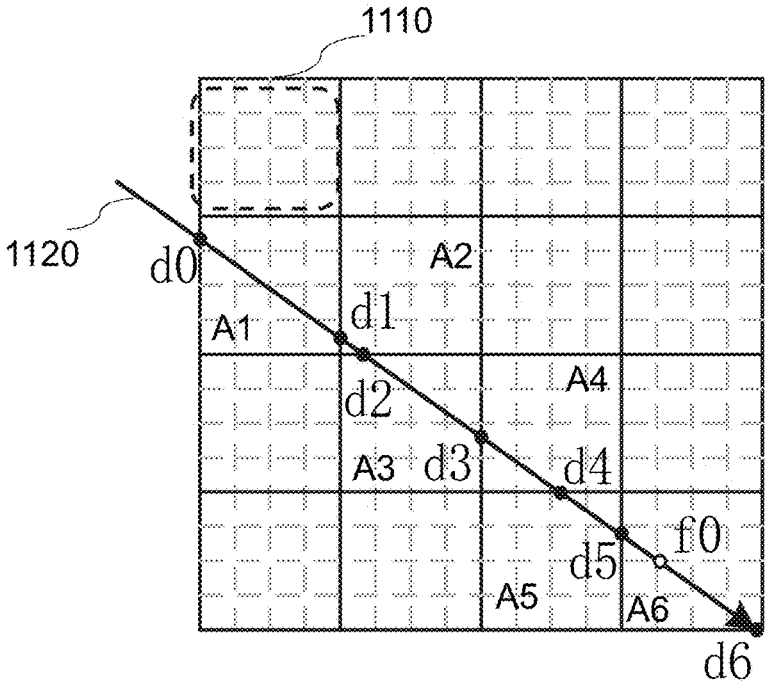
FIG. 11 is a schematic diagram of the intersection of a ray and at least a portion of homogeneous data blocks corresponding to 3D imaging data 1000 in FIG. 10 according to some embodiments of the present disclosure.

FIG. 11 is a schematic diagram of the intersection of a ray and at least a portion of homogeneous data blocks corresponding to 3D imaging data 1000 in FIG. 10 according to some embodiments of the present disclosure. As shown in FIG. 11, each homogeneous data block 1110 may correspond to one data block 1010 in FIG. 10. A propagation path of a ray 1120 in a homogeneous data block may be a straight line. Point f0 may represent a candidate sampling point. Intersection points between the ray 1120 and homogeneous data blocks of the 3D imaging data 1000 may include points d0, d1, d2, d3, d4, and d5.

The processing device 140A may determine one or more step distances based on a distance between every two adjacent intersection points. For example, the processing device 140A may determine whether the candidate sampling point f0 is in the homogeneous data block A1 based on a distance between intersection points d0 and d1. If the candidate sampling point f0 is not in the homogeneous data block A1, the processing device 140A may further determine whether the candidate sampling point f0 is in the homogeneous data block A2 based on a distance between intersection points d1 and d2. If the candidate sampling point f0 is not in the homogeneous data block A2, the processing device 140A may further determine whether the candidate sampling point f0 is in the homogeneous data block A3 based on a distance between intersection points d2 and d3. By analogy, until it is determined that the candidate sampling point f0 is in the homogeneous data block A6, the processing device 140A may further determine a location of the candidate sampling point f0 in the homogeneous data block A6. The processing device 140A may further determine whether the candidate sampling point is a real particle based on the location of the candidate sampling point f0.

FIG. 12 is a schematic diagram illustrating a process for dividing 3D imaging data into a plurality of data blocks according to some embodiments of the present disclosure. As shown in FIG. 12, 3D imaging data 1200 may include a first resolution of 16×16. The processing device 140A may determine a pyramid tree based on the first resolution of the 3D imaging data 1200. The pyramid tree may include at least two layers (e.g., 3) of data blocks.

According to FIG. 12, a first layer 1210 (i.e., the top layer) of the pyramid tree may have the first resolution (i.e., 16×16). That is, the first layer 1210 may include one data block. The data block in the first layer 1210 may include 4 parent nodes 1201. The processing device 140A may divide the data block in the first layer 1210 into several data blocks to generate a second layer 1220. For example, the data block having 4 parent nodes 1201 in the first layer 1210 may be divided into data blocks having a total of 8 child nodes 1204. The second layer 1220 may include 4 data blocks each of which has a second resolution of 8×8. The processing device 140A may further divided each data block in the second layer of the pyramid tree into several data blocks in a manner similar to dividing the data block in the first layer 1210 to generate a third layer 1230. That is, the processing device 140A may recursively determine each layer of the pyramid tree from top to bottom. The third layer 1230 may include 16 data blocks each of which has a third resolution of 4×4.

FIG. 13 is a schematic diagram of the intersection of a ray and at least a portion of homogeneous data blocks of a pyramid tree according to some embodiments of the present disclosure. The pyramid tree in FIG. 13 may be generated based on 3D imaging data 1200. As shown in FIG. 13, each homogeneous data block in each layer of the pyramid tree may correspond to one data block in FIG. 12. A propagation path of a ray 1305 in a homogeneous data block may be a straight line. Point f0 may represent a candidate sampling point. Intersection points between the ray 1305 and homogeneous data blocks of the pyramid tree may include points c0, c1, c2, c3, c4, and c5.

Intersection points c0-c5 may be determined by performing a recursion operation on intersecting between the ray and each homogeneous data block in each layer of the pyramid tree. For example, the processing device 140A may determine the intersection point c0 by calculating the intersection between the ray and the homogeneous data block in the first layer 1310. In response to determining that there is a layer of homogeneous data blocks below the first layer 1310 (i.e., the second layer 1320), the processing device 140A may determine additional intersection points c1 and c2 by calculating the intersection between the ray and the homogeneous data blocks in the second layer 1320. In response to determining that there is a layer of homogeneous data blocks below the second layer 1320 (i.e., the third layer 1330), the processing device 140A may determine additional intersection points c3 and c4 by calculating the intersection between the ray and the homogeneous data blocks in the third layer 1330. In response to determining that there is no any layer of homogeneous data blocks below the third layer 1330), the processing device 140A may further determine an exit intersection point by calculating the intersection between the ray and the homogeneous data blocks in the third layer 1330. The processing device 140A may determine a location of the candidate sampling point f0 based on the intersection points c0-c5 as described in FIG. 11. The processing device 140A may further determine whether the candidate sampling point f0 is a real particle based on the location of the candidate sampling point f0.

FIG. 14 is a schematic diagram illustrating exemplary images of a training sample according to some embodiments of the present disclosure. As shown in FIG. 14, a training sample 1400 may include a sample initial rendered image 1410 and a reference rendered image 1420. The sample initial rendered image 1410 and the reference rendered image 1420 may correspond to a same sample subject. In some embodiments, the sample initial rendered image 1410 and the reference rendered image 1420 may be generated by perform different counts of ray tracing operations on 3D imaging data of the sample subject as described in connection with operation 610 in FIG. 6. According to FIG. 14, the reference rendered image 1420 may be smoother and cleaner than the sample initial rendered image 1410. In other words, the reference rendered image 1420 may have a higher image quality than the sample initial rendered image 1410.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python, or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:

at least one storage device storing executable instructions for image processing; and at least one processor in communication with the at least one storage device, wherein when executing the executable instructions, the at least one processor is configured to cause the system to perform operations including:

performing a first threshold count of ray tracing operations on three-dimensional (3D) imaging data of a subject to determine a plurality of radiance values, each radiance value corresponding to one pixel of a plurality of pixels on an image plane, wherein each radiance value of the plurality of radiance values is determined by:

determining a second threshold count of candidate radiance values by performing the first threshold count of ray tracing operations, each ray tracing operation corresponding to one candidate radiance value; and determining the radiance value by averaging the second threshold count of candidate radiance values;

generating an initial rendered image based on the plurality of radiance values of the plurality of pixels;

obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model.

2. The system of claim 1, wherein for each pixel of the plurality of pixels on the image plane, to determine each candidate radiance value of the second threshold count of candidate radiance values, the at least one processor is further configured to cause the system to perform operations including:

dividing the 3D imaging data into a plurality of data blocks, each data block including multiple voxels of the 3D imaging data;

generating a plurality of homogeneous data blocks by:

determining a maximum extinction coefficient among multiple extinction coefficients of the multiple voxels in each data block of the plurality of data blocks; and generating the plurality of homogeneous data blocks, in each of which all the multiple voxels have the maximum extinction coefficient by designating a virtual extinction coefficient to each voxel in the data block;

determining, based on the plurality of homogeneous data blocks, a plurality of target sampling points by performing a ray tracing operation; and determining the candidate radiance value corresponding to the pixel on the image plane based on the plurality of target sampling points.

3. The system of claim 2, wherein the dividing the 3D imaging data into a plurality of data blocks includes:

dividing, based on a first resolution of the 3D imaging data, the 3D imaging data into the plurality of data blocks each of which has a second resolution smaller than the first resolution.

4. The system of claim 2, wherein the 3D imaging data includes a plurality of voxels, at least one voxel of the plurality of voxels includes multiple real particles, and the dividing the 3D imaging data into a plurality of data blocks includes:

determining, based on a first resolution of the 3D imaging data, a pyramid tree including at least two layers of data blocks, each layer of the at least two layers of data blocks including the plurality of voxels, the top layer of the at least two layers having the first resolution, wherein from top to bottom of the pyramid tree, a current count of data blocks in a current layer is greater than a previous count of data blocks in a previous layer; and each data block of the current layer of the at least two layers has a current resolution smaller than a previous resolution of each data block of the previous layer.

5. The system of claim 2, wherein the ray tracing operation includes casting a ray passing through the 3D imaging data in a projection direction from each pixel on an image plane, at least a portion of the plurality of target sampling points are on a path of the ray corresponding to one pixel on the image plane, and the determining, based on the plurality of homogeneous data blocks, a plurality of target sampling points by performing a ray tracing operation includes:

for each pixel on the image plane, determining, based on the maximum extinction coefficient of an intermediate homogeneous data block corresponding to an intermediate starting point, a sampling path length, the intermediate starting point being a starting point of the ray on the 3D imaging data or a previous candidate sampling point, the intermediate homogeneous data block being a current homogeneous data block to which the intermediate starting point belongs;

determining, based on the sampling path length, a current candidate sampling point;

determining whether the current candidate sampling point is a real particle; and in response to determining that the current candidate sampling point is the real particle, designating the current candidate sampling point as the target sampling point.

6. The system of claim 5, wherein the determining whether the current candidate sampling point is a real particle includes:

determining intersection points between the ray and at least part of the plurality of homogeneous data blocks;

determining, based on the intersection points, a target homogeneous data block to which the current candidate sampling point belongs;

determining a location of the current candidate sampling point in the target homogeneous data block; and determining, based on the location of the current candidate sampling point in the target homogeneous data block, whether the current candidate sampling point is the real particle.

7. The system of claim 6, wherein when the plurality of data blocks form a pyramid tree including at least two layers of data blocks, the determining intersection points between the ray and at least part of the plurality of homogeneous data blocks includes:

determining the intersection points by performing a recursive operation on intersecting between the ray and each homogeneous data block in each layer of the at least two layers.

8. The system of claim 5, wherein the at least one processor is further configured to cause the system to perform operations including:

in response to determining that the current candidate sampling point is a virtual particle, designating the current candidate sampling point as an updated starting point;

determining an updated candidate sampling point from the updated starting point without changing the projection direction of the ray; and determining whether the updated candidate sampling point is the target sampling point.

9. The system of claim 1, wherein the one or more characteristic parameters include at least one of a color, a depth, a normal vector, or an opacity of each pixel on an image plane.

10. The system of claim 9, wherein the determining one or more characteristic parameters corresponding to the 3D imaging data by performing a ray casting operation on the 3D imaging data includes:

for each pixel on the image plane, casting a ray in a projection direction from the pixel to the 3D imaging data;

determining, based on a first relationship between each voxel value of the 3D imaging data and one color, colors of voxels that the ray passes through; and determining the color of the pixel on the image plane based on the colors of the voxels.

11. The system of claim 10, wherein the at least one processor is further configured to cause the system to perform operations including:

determining, based on a second relationship between each voxel value of the 3D imaging data and one opacity, a current opacity of each voxel that the ray passes through;

for each voxel, determining a superimposed opacity of the voxel based on the current opacity of the voxel and previous opacities of previous voxels; and determining the depth or the normal vector of the pixel on the image plane by comparing the superimposed opacity of each voxel with an opacity threshold.

12. The system of claim 11, wherein the determining the depth or the normal vector of the pixel on the image plane by comparing the superimposed opacity of each voxel with an opacity threshold includes:

in response to determining that there are one or more voxels whose superimposed opacity is greater than the opacity threshold, determining, based on location information of a foremost voxel whose superimposed opacity is greater than the opacity threshold, the depth of the pixel on the image plane; and determining, based on voxel values of the 3D imaging data surrounding the foremost voxel, the normal vector of the pixel on the image plane.

13. The system of claim 11, wherein the determining the depth or the normal vector of the pixel on the image plane by comparing the superimposed opacity of each voxel with an opacity threshold includes:

in response to determining that there is no voxel whose superimposed opacity is greater than the opacity threshold, determining, based on location information of a reference voxel with a largest opacity among the voxels that the ray passes through, the depth of the pixel on the image plane; and determining, based on voxel values of the 3D imaging data surrounding the reference voxel, the normal vector of the pixel on the image plane.

14. The system of claim 1, wherein to obtain the trained image processing model, the at least one processor is further configured to cause the system to perform operations including:

obtaining a plurality of training samples, each training sample including a sample initial rendered image, one or more sample characteristic parameters corresponding to the sample initial rendered image, and a reference rendered image corresponding to the sample initial rendered image and having a higher image quality than the corresponding sample initial rendered image; and generating a trained image processing model by training a preliminary model using the plurality of training samples in a training process, wherein during the training process:

the sample initial rendered image and the one or more sample characteristic parameters serve as inputs for training the preliminary model, and the reference rendered image serves as a desired output for training the preliminary model.

15. The system of claim 14, wherein the training process includes a plurality of iterations, at least one iteration of the plurality of iterations including:

determining a prediction output by inputting the sample initial rendered image and the one or more sample characteristic parameters into an intermediate model, the intermediate model being the preliminary model in the first iteration of the plurality of iterations or an updated model generated in a previous iteration;

determining a value of a loss function based on the prediction output and the reference rendered image; and updating at least one parameter of the intermediate model based on the value of the loss function.

16. The system of claim 15, wherein the loss function includes at least one of:

a first term related to a first difference between each pixel value of the prediction output and the corresponding pixel value of the reference rendered image; or a second term related to a second difference between a gradient of each pixel value of the prediction output and a gradient of the corresponding pixel value of the reference rendered image.

17. A method for image processing, implemented on a computing device having at least one processor and at least one storage device, the method comprising:

obtaining an initial rendered image of a subject generated based on three-dimensional (3D) imaging data, including:

dividing three-dimensional (3D) imaging data of a subject into a plurality of data blocks, each data block including multiple voxels of the 3D imaging data;

generating a plurality of homogeneous data blocks by:

determining a maximum extinction coefficient among multiple extinction coefficients of the multiple voxels in each data block of the plurality of data blocks; and generating the plurality of homogeneous data blocks, in each of which all the multiple voxels have the maximum extinction coefficient by designating a virtual extinction coefficient to each voxel in the data block; and determining, based on the plurality of homogeneous data blocks, a plurality of target sampling points by performing a ray tracing operation;

obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model.

18. The method of claim 17, wherein for each pixel of the plurality of pixels on the image plane, to determine each candidate radiance value of the second threshold count of candidate radiance values, the at least one processor is further configured to cause the system to perform operations including:

dividing the 3D imaging data into a plurality of data blocks, each data block including multiple voxels of the 3D imaging data;

generating a plurality of homogeneous data blocks by:

determining a maximum extinction coefficient among multiple extinction coefficients of the multiple voxels in each data block of the plurality of data blocks; and generating the plurality of homogeneous data blocks, in each of which all the multiple voxels have the maximum extinction coefficient by designating a virtual extinction coefficient to each voxel in the data block;

determining, based on the plurality of homogeneous data blocks, a plurality of target sampling points by performing a ray tracing operation; and determining the candidate radiance value corresponding to the pixel on the image plane based on the plurality of target sampling points.

19. The method of claim 18, wherein the dividing the 3D imaging data into a plurality of data blocks includes:

dividing, based on a first resolution of the 3D imaging data, the 3D imaging data into the plurality of data blocks each of which has a second resolution smaller than the first resolution.

20. A non-transitory computer readable medium, comprising at least one set of instructions for image processing, wherein when executed by at least one processor of a computing device, the at least one set of instructions direct the at least one processor to perform operations including:

obtaining an initial rendered image of a subject generated based on three-dimensional (3D) imaging data;

obtaining one or more characteristic parameters corresponding to the 3D imaging data determined by performing a ray casting operation on the 3D imaging data; and generating a target rendered image of the subject by inputting the initial rendered image and the one or more characteristic parameters into a trained image processing model, wherein to obtain the trained image processing model, the at least one processor is further configured to cause the system to perform operations including;

obtaining a plurality of training samples, each training sample including a sample initial rendered image, one or more sample characteristic parameters corresponding to the sample initial rendered image, and a reference rendered image corresponding to the sample initial rendered image and having a higher image quality than the corresponding sample initial rendered image; and generating a trained image processing model by training a preliminary model using the plurality of training samples in a training process, wherein during the training process:

the sample initial rendered image and the one or more sample characteristic parameters serve as inputs for training the preliminary model, and the reference rendered image serves as a desired output for training the preliminary model.

\* \* \* \* \*